(12) United States Patent
Hoeffer et al.

(10) Patent No.: US 12,118,106 B2
(45) Date of Patent: Oct. 15, 2024

(54) METHODS AND SYSTEMS FOR EXTENDING ROW-LEVEL SECURITY POLICIES

(71) Applicant: K2 Software, Inc., Bellevue, WA (US)

(72) Inventors: Paul Hoeffer, Mercer Island, WA (US); Lewis Garmston, Seattle, WA (US); Grant Dickinson, Bellevue, WA (US)

(73) Assignee: K2 Software, Inc., Bellevue, WA (US)

( * ) Notice: Subject to any disclaimer, the term of this patent is extended or adjusted under 35 U.S.C. 154(b) by 577 days.

(21) Appl. No.: 16/286,979

(22) Filed: Feb. 27, 2019

(65) Prior Publication Data

US 2020/0272750 A1 Aug. 27, 2020

(51) Int. Cl.
*G06F 21/60* (2013.01)
*G06F 21/62* (2013.01)

(52) U.S. Cl.
CPC ........ *G06F 21/6218* (2013.01); *G06F 21/604* (2013.01)

(58) Field of Classification Search
CPC ............................ G06F 21/6218; G06F 21/604
USPC ............................................................ 726/1
See application file for complete search history.

(56) References Cited

U.S. PATENT DOCUMENTS

| | | | | |
|---|---|---|---|---|
| 4,807,110 A | * | 2/1989 | Pomerene | G06F 12/0862 |
| | | | | 711/118 |
| 5,740,440 A | * | 4/1998 | West | G06F 8/24 |
| | | | | 714/E11.217 |
| 5,950,210 A | * | 9/1999 | Nelson | G06F 16/219 |
| 6,158,007 A | * | 12/2000 | Moreh | G06F 21/6227 |
| | | | | 726/1 |
| 6,308,181 B1 | * | 10/2001 | Jarvis | G06F 21/6227 |
| | | | | 707/999.102 |
| 7,483,915 B2 | * | 1/2009 | Thompson | G06F 16/289 |
| 7,529,811 B2 | * | 5/2009 | Thompson | G06F 16/284 |
| | | | | 707/999.005 |

(Continued)

FOREIGN PATENT DOCUMENTS

| | | | | |
|---|---|---|---|---|
| CN | 110443059 A | * | 11/2019 | ............... G06F 9/54 |
| RU | 2682010 C1 | * | 3/2019 | |

OTHER PUBLICATIONS

Rjaibi, Walid. "An introduction to multilevel secure relational database management systems." In Proceedings of the 2004 conference of the Centre for Advanced Studies on Collaborative research, pp. 232-241. 2004. (Year: 2004).*

(Continued)

*Primary Examiner* — Luu T Pham
*Assistant Examiner* — Walter J Malinowski
(74) *Attorney, Agent, or Firm* — Perkins Coie LLP

(57) ABSTRACT

Methods and systems for creating and extending a row-level security (RLS) policy are provided. In one embodiment, a method is provided that includes creating an RLS policy for a primary object and searching a relationship database for one or more child relationships of the primary object. The method may further include filtering the one or more child relationships to identify a valid child relationship of the primary object. A child object of the primary object may then be identified based on the valid child relationship. The method may further include receiving a request to extend the RLS policy to the child object, and extending the RLS policy to the child object.

19 Claims, 10 Drawing Sheets

(56) References Cited

U.S. PATENT DOCUMENTS

| | | | | |
|---|---|---|---|---|
| 8,875,249 | B2* | 10/2014 | Ture | G06F 16/951 |
| | | | | 726/28 |
| 9,059,954 | B1* | 6/2015 | Cohen | H04L 51/212 |
| 9,612,959 | B2* | 4/2017 | Caudy | G06F 16/2379 |
| 9,747,363 | B1* | 8/2017 | Smith | G06F 16/2237 |
| 9,811,863 | B1* | 11/2017 | Marinescu | G06Q 40/08 |
| 10,627,157 | B1* | 4/2020 | Ruth | G01R 31/382 |
| 2002/0194211 | A1* | 12/2002 | Subramanian | G06F 16/972 |
| | | | | 715/200 |
| 2003/0220771 | A1* | 11/2003 | Vaidyanathan | G16B 30/00 |
| | | | | 703/2 |
| 2003/0229623 | A1* | 12/2003 | Chang | G06F 21/6218 |
| 2004/0243613 | A1* | 12/2004 | Pourheidari | G06F 16/951 |
| 2005/0058263 | A1* | 3/2005 | Frazier | H04M 3/53366 |
| | | | | 379/88.13 |
| 2005/0065980 | A1* | 3/2005 | Hyatt | G06F 16/245 |
| 2005/0216465 | A1* | 9/2005 | Dutta | G06F 16/217 |
| 2005/0283501 | A1* | 12/2005 | Blaicher | G06F 16/284 |
| 2006/0004689 | A1* | 1/2006 | Chandrasekaran | G06F 16/10 |
| 2006/0070082 | A1* | 3/2006 | Sridhar | G06F 8/41 |
| | | | | 719/318 |
| 2006/0195449 | A1* | 8/2006 | Hunter | G06F 21/6227 |
| 2007/0208734 | A1* | 9/2007 | Koide | G06F 21/41 |
| 2007/0208746 | A1* | 9/2007 | Koide | G06F 21/6218 |
| | | | | 707/999.009 |
| 2007/0208755 | A1* | 9/2007 | Bhatkar | G06F 21/6218 |
| 2007/0209080 | A1* | 9/2007 | Ture | G06F 16/951 |
| | | | | 726/28 |
| 2008/0021901 | A1* | 1/2008 | Skaria | G06F 16/188 |
| 2008/0208645 | A1* | 8/2008 | Molloy | G06Q 10/06 |
| | | | | 705/7.11 |
| 2008/0235231 | A1* | 9/2008 | Gass | G06F 21/6227 |
| 2009/0012941 | A1* | 1/2009 | Schaaf | G06F 21/6218 |
| 2009/0103916 | A1* | 4/2009 | Dolan, III | H04L 41/0213 |
| | | | | 707/999.1 |
| 2009/0187964 | A1* | 7/2009 | Kao | H04L 63/102 |
| | | | | 726/1 |
| 2009/0199273 | A1* | 8/2009 | Yalamanchi | G06F 21/6227 |
| | | | | 726/4 |
| 2009/0307599 | A1* | 12/2009 | Davies | G06Q 10/087 |
| | | | | 715/738 |
| 2011/0320419 | A1* | 12/2011 | Johnston | G06F 16/219 |
| | | | | 707/703 |
| 2012/0047560 | A1* | 2/2012 | Underwood | G06F 21/30 |
| | | | | 726/4 |
| 2012/0143938 | A1* | 6/2012 | du Preez | H04L 61/2015 |
| | | | | 709/201 |
| 2012/0216240 | A1* | 8/2012 | Gottumukkala | G06F 21/6218 |
| | | | | 726/1 |
| 2012/0240242 | A1* | 9/2012 | Ferenczi | G06F 21/604 |
| | | | | 726/28 |
| 2013/0054570 | A1* | 2/2013 | Gonzales | G06F 21/6218 |
| | | | | 707/769 |
| 2014/0037218 | A1* | 2/2014 | Zweig | G06F 16/5866 |
| | | | | 382/218 |
| 2014/0172850 | A1* | 6/2014 | Borkar | G06F 16/288 |
| | | | | 707/736 |
| 2014/0281514 | A1* | 9/2014 | Erofeev | H04L 9/0897 |
| | | | | 713/165 |
| 2014/0380425 | A1* | 12/2014 | Lockett | G06F 21/00 |
| | | | | 726/4 |
| 2016/0092499 | A1* | 3/2016 | Leigh | G06F 8/34 |
| | | | | 707/740 |
| 2017/0102961 | A1* | 4/2017 | Hilemon | G06F 9/465 |
| 2017/0316052 | A1* | 11/2017 | Marin | G06F 16/2282 |
| 2018/0300572 | A1* | 10/2018 | Esman | G06K 9/00899 |
| 2019/0215303 | A1* | 7/2019 | Appala | H04L 63/104 |
| 2019/0286636 | A1* | 9/2019 | Bedard | G06F 16/2465 |
| 2019/0394041 | A1* | 12/2019 | Jain | H04L 9/0894 |
| 2020/0301917 | A1* | 9/2020 | Niu | G06F 16/2282 |

OTHER PUBLICATIONS

Row-Level Security—SQL Server / Microsoft Docs, https://docs.microsoft.com/en-us/sql relational-databases/security/row-level-security?view=sql-server-2017, 14 pages, 2017. (Year: 2017).*

Premerlani, William J., James E. Rumbaugh, Michael R. Blaha, and Thomas A. Varwig. "An object-oriented relational database." Communications of the ACM 33, No. 11 (1990): 99-109. (Year: 1990).*

Gopinath, Prabha, Rajiv Ramnath, and Karsten Schwan. "Entity-relationship database support for real-time adaptation." In Proceedings. PARBASE-90: International Conference on Databases, Parallel Architectures, and Their Applications, pp. 91-93. IEEE, 1990. (Year: 1990).*

Imran, Sohail, and Irfan Hyder. "Security issues in databases." In 2009 Second International Conference on Future Information Technology and Management Engineering, pp. 541-545. IEEE, 2009. (Year: 2009).*

Czajkowski, Karl, Carl Kesselman, and Robert Schuler. "ERMREST: A collaborative data catalog with fine grain access control." In 2017 Ieee 13th international conference on E-science (E-science), pp. 510-517. IEEE, 2017. (Year: 2017).*

Ambhore, Premchand B., B. B. Meshram, and V. B. Waghmare. "A implementation of object oriented database security." In 5th ACIS International Conference on Software Engineering Research, Management & Applications (SERA 2007), pp. 359-365. IEEE, 2007. (Year: 2007).*

Covington, Michael J., Prahlad Fogla, Zhiyuan Zhan, and Mustaque Ahamad. "A context-aware security architecture for emerging applications." In 18th Annual Computer Security Applications Conference, 2002. Proceedings., pp. 249-258. IEEE, 2002. (Year: 2002).*

Antoshchuk, Svetlana G., Alexander A. Blazhko, and Ebaa Saoud. "Automated design method of hierarchical access control in database." In 2009 IEEE International Workshop on Intelligent Data Acquisition and Advanced Computing Systems: Technology and Applications, pp. 360-363. IEEE, 2009. (Year: 2009).*

Braman, Sandra. Change of state: Information, policy, and power. Mit Press, 2009. (Year: 2009).*

To, et al.; Row-Level Security; https://docs.microsoft.com/en-us/sql/relational-databases/security/row-level-security?view=sql-server-2017; Published Nov. 5, 2018; Retrieved Feb. 21, 2019, (14 pages).

European Search Report dated Jun. 16, 2020 issued for European Patent Application No. 20159557.6.

Office Action dated May 19, 2022 issued for European Patent Application No. 20159557.6.

* cited by examiner

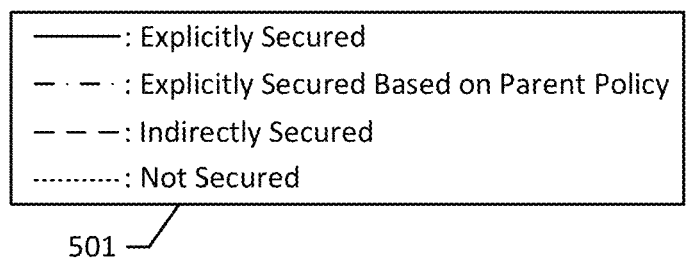
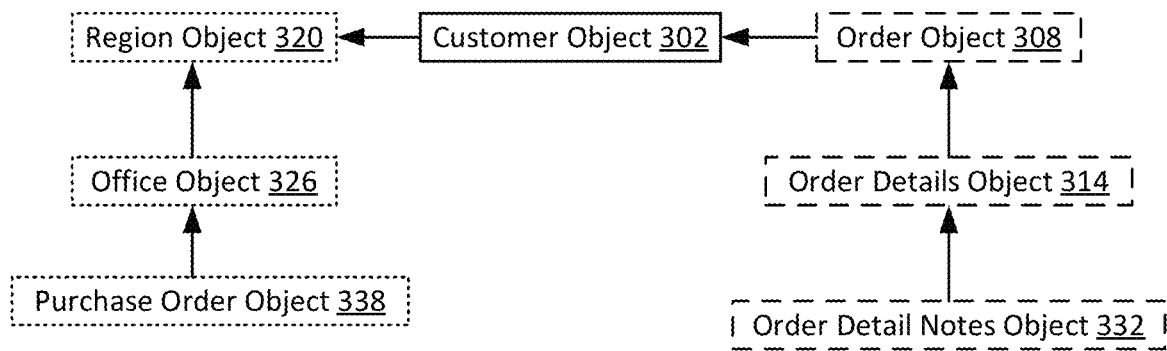
FIG. 5A
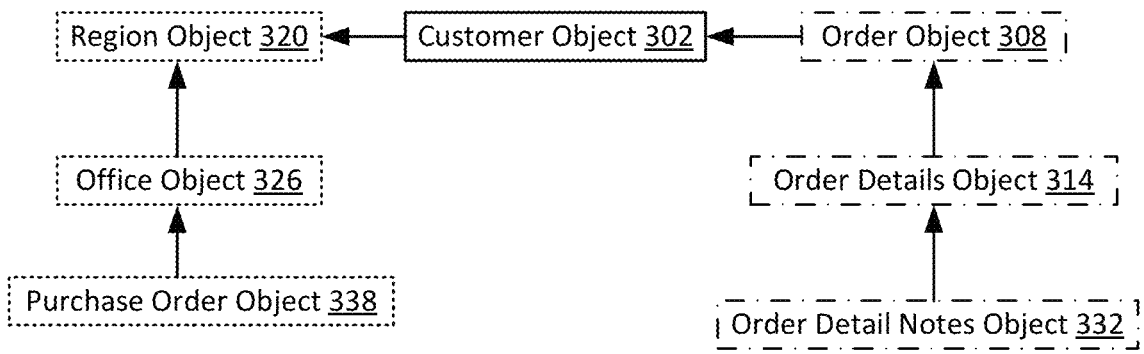
FIG. 5B

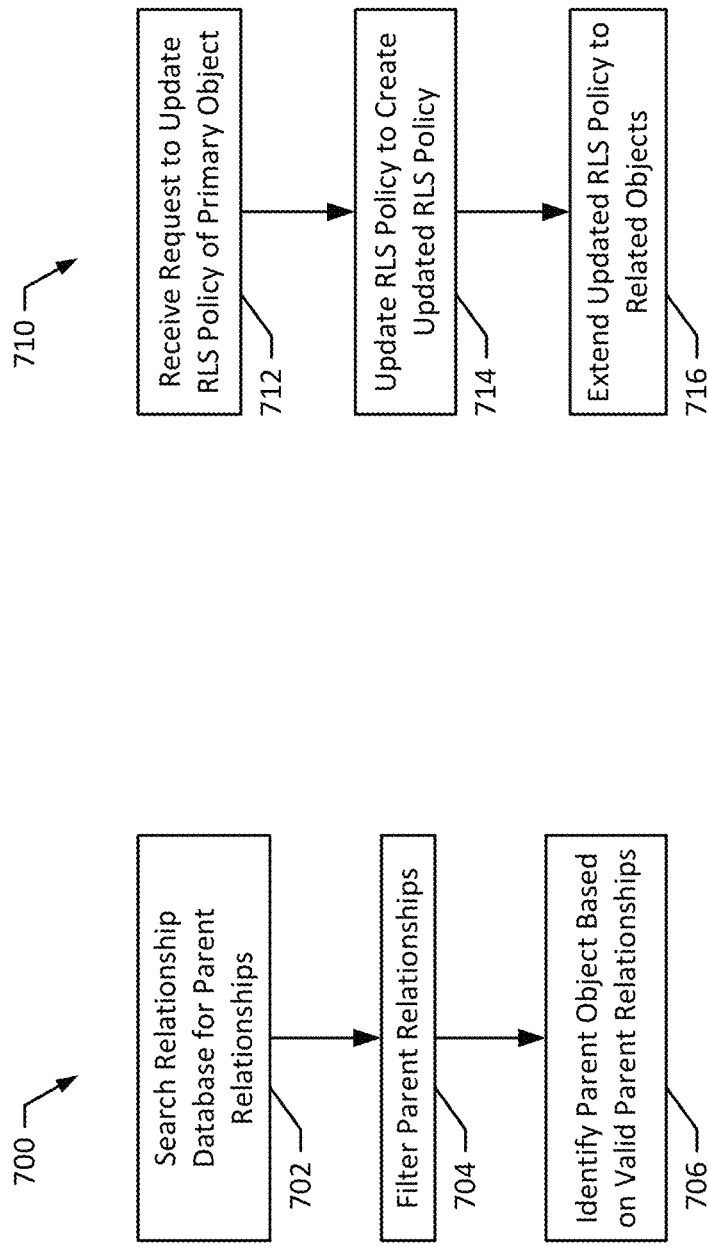

METHODS AND SYSTEMS FOR EXTENDING ROW-LEVEL SECURITY POLICIES

BACKGROUND

The contents of computer databases may need to be secured so that only authorized users can access the data. Such databases may be secured with row-level security policies. Such row-level security policies may include information on which users have access to data within the table on a per-row, or per-entry basis. These policies may ensure that users can only access data that they are authorized to (e.g., data that corresponds to each user, or is relevant to the user).

SUMMARY

The present disclosure presents new and innovative systems and methods for extending row-level security policies. In one embodiment, a method is provided comprising creating a row-level security (RLS) policy for a primary object, wherein the RLS policy comprises (i) an access control list specifying row-level access permissions and (ii) a first plurality of SQL statements implementing the access control list. The method may further comprise searching a relationship database for one or more child relationships of the primary object, filtering the one or more child relationships to identify one or more valid child relationships by (i) determining whether each of the one or more child relationships is valid or invalid, and (ii) removing each invalid child relationship, and identifying a child object of the primary object based on the one or more valid child relationships. The method may also comprise receiving a request to extend the RLS policy to the child object and extending the RLS policy to the child object.

In another embodiment, identifying the child object of the primary object based on the one or more valid child relationships, receiving the request to extend the RLS policy to the child object, and extending the RLS policy to the child object further comprises identifying a plurality of child objects of the primary object based on the one or more valid child relationships, receiving a request to extend the RLS policy to a subset of the plurality of child objects, and extending the RLS policy to the subset of the plurality of child objects.

In a further embodiment, the primary object is a SmartBox Object configured to store its data in a related SQL table.

In a still further embodiment, the RLS policy is generated for the related SQL table in response to receiving a request to apply a data access policy to the SmartBox Object.

In another embodiment, the data access policy includes a policy selected from the group consisting of: (i) a full access policy, (ii) a limited access polity, and (iii) a combination of a full access policy and a limited access policy for data stored within the related SQL table.

In yet another embodiment, extending the RLS policy includes generating a second plurality of SQL statements to extend the RLS policy to the child object.

In a further embodiment, searching a relationship database for the one or more child relationships of the primary object further comprises identifying one or more foreign-key relationships of the primary object within the relationship database.

In a still further embodiment, the method further comprises searching the relationship database for one or more parent relationships of the primary object, filtering the one or more parent relationships to identify one or more valid parent relationships by (i) determining whether each of the one or more parent relationships is valid or invalid, and (ii) removing each invalid parent relationship, and identifying a parent object of the primary object based on the one or more valid parent relationships.

In another embodiment, the method further comprises receiving a request to update the RLS policy, updating the RLS policy for the primary object to create an updated RLS policy, and extending the updated RLS policy to the child object.

In yet another embodiment, the method further comprises receiving a request to update the RLS policy, updating the RLS policy for the primary object to create an updated RLS policy, and extending the updated RLS policy to the parent object.

In a further embodiment, invalid child relationships include child relationships that are forbidden, circular, or duplicative.

In a still further embodiment, a system is provided comprising a processor and a memory containing instructions which, when executed by the processor, cause the processor to implement a row-level security (RLS) policy creator configured to create an RLS policy for a primary object, wherein the RLS policy comprises (i) an access control list specifying row-level access permissions and (ii) a first plurality of SQL statements implementing the access control list. The memory may contain further instructions which, when executed by the processor, cause the processor to implement a related object identifier configured to search a relationship database for one or more child relationships of the primary object, filter the one or more child relationships to identify one or more valid child relationships by (i) determining whether each of the one or more child relationships is valid or invalid, and (ii) removing each invalid child relationship, and identify a child object of the primary object based on the one or more valid child relationships. The memory may contain further instructions which, when executed by the processor, cause the processor to implement an RLS policy extender configured to receive a request to extend the RLS policy to the child object and extend the RLS policy to the child object.

In another embodiment, the child object identifier is further configured to identify a plurality of child objects of the primary object based on the one or more valid child relationships, and the RLS policy extender is further configured to receive a request to extend the RLS policy to a subset of the plurality of child objects and extend the RLS policy to the subset of the plurality of child objects.

In yet another embodiment, the primary object is a SmartBox Object configured to store its data in a related SQL table.

In a further embodiment, the RLS policy extender is further configured to generate a second plurality of SQL statements to extend the RLS policy to the child object.

In a still further embodiment, the child object identifier is further configured to identify one or more foreign-key relationships of the primary object within the relationship database.

In another embodiment, the related object identifier is further configured to search the relationship database for one or more parent relationships of the primary object, filter the one or more parent relationships to identify one or more valid parent relationships by (i) determining whether each of the one or more parent relationships is valid or invalid, and (ii) removing each invalid parent relationship, and identify a parent object of the primary object based on the one or more parent relationships.

In yet another embodiment, the RLS policy creator is further configured to receive a request to update the RLS policy and update the RLS policy for the primary object to create an updated RLS policy. The RLS policy extender may also be further configured to extend the updated RLS policy to the child object.

In a further embodiment, the RLS policy creator is further configured to receive a request to update the RLS policy and update the RLS policy for the primary object to create an updated RLS policy. The RLS policy extender may also be further configured to extend the updated RLS policy to the parent object.

In a still further embodiment, a non-transitory, computer-readable medium is provided storing instructions which, when executed by a processor, cause the processor to create a row-level security (RLS) policy for a primary object, wherein the RLS policy comprises (i) an access control list specifying row-level access permissions and (ii) a first plurality of SQL statements implementing the access control list and search a relationship database for one or more child relationships of the primary object. The non-transitory, computer-readable medium may store further instructions which, when executed by a processor, cause the processor to filter the one or more child relationships to identify one or more valid child relationships by (i) determining whether each of the one or more child relationships is valid or invalid, and (ii) removing each invalid child relationship, identify a child object of the primary object based on the one or more valid child relationships, receive a request to extend the RLS policy to the child object, and extend the RLS policy to the child object.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 5A-5C illustrate table security states according to exemplary embodiments of the present disclosure.

FIGS. 7A-7B illustrate methods according to exemplary embodiments of the present disclosure.

DETAILED DESCRIPTION OF EXAMPLE EMBODIMENTS

Figure 1:
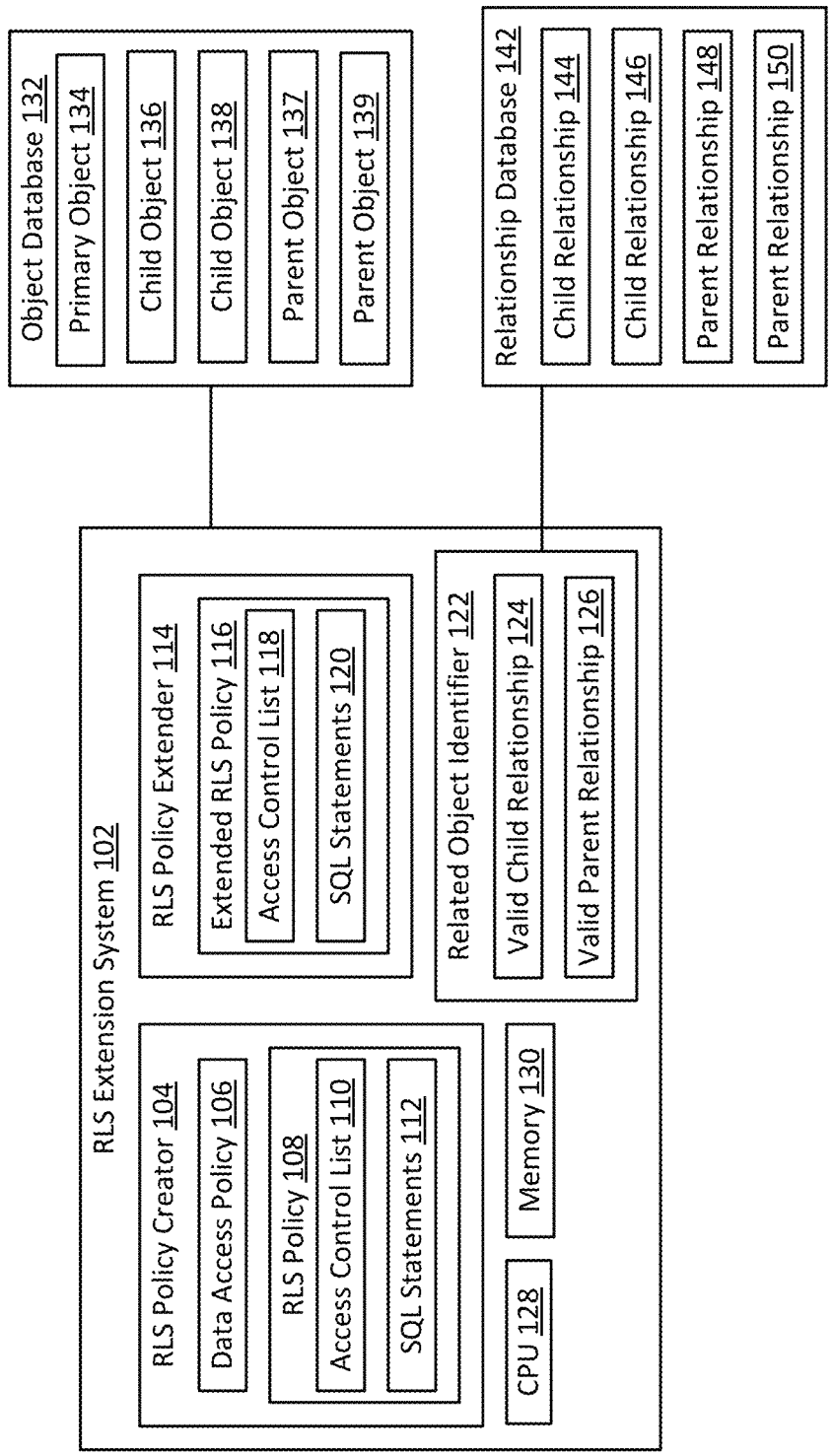
FIG. 1 illustrates a system according to an exemplary embodiment of the present disclosure.

Certain database systems, such as Microsoft® SQL Server provide row-level security (RLS) policies (e.g., for structured query language (SQL) databases). In particular, SQL Server enables RLS policies that secure access to individual tables using access control lists (ACLs) that identify (i) authorized users for a given table and (ii) authorize rows within the given table with permitted access for each authorized user.

In certain implementations, it may be possible to secure tables of a database based on ACLs applied to other, related tables. For example, access to data stored in one table may require authorization to access related data in a separate, related table of the database. In practice, this indirect security is generally less reliable and often harder to monitor. For example, in such indirect implementations, there is no direct record of a policy extending to related tables. This lack of record makes it harder to audit and confirm the security policies protecting tables within the database. Further, the lack of a direct policy for certain tables make such tables less secure, as a vulnerability in the security policy of a related table may compromise all subsequent tables depending on the table for security. Further, such indirect implementations are less granular. For example, it may be advantageous to have certain individuals able to access data in one table, but remain unable to access related data in another table. Purely indirect security policies may be enabled to implement such access control on a per-user basis.

However, if a user wants multiple tables to be explicitly covered by the same security policy, the user will typically manually re-create the policy for each subsequent table, and then manually update each policy. Such manual implementations are error-prone and time-consuming. Furthermore, creating these policies must be performed through code, which can be difficult for users to parse, leading to further potential errors when extending RLS policies. In particular, due to the complexity involved, such databases and related security policies are typically handled by a database administrator, while decisions regarding which users are authorized to access certain portions of the database are generally made by non-technical employees. This split supervision of database security both increases complexity and undermines security by delaying the deployment or update of new security policies, as well as creating opportunities for database administrators to compromise such policies in ways that are difficult to notice or detect.

One solution to this problem is to search a relationship database for child and parent relationships of an object after an RLS policy is created for the object. These relationships may include child relationships (e.g., objects relying on the data stored within the primary object) and parent relationships (e.g., objects on which data stored within the primary object depend). Such relationships may include invalid relationships, such as forbidden relationships, circular relationships, or duplicative relationships. Therefore, in order to identify valid child or parent objects, the relationships may be analyzed to determine whether each relationship is invalid, and invalid relationships may be removed, as such relationships may void certain RLS requirements, or create inconsistencies in subsequent operations utilizing the relationships. Valid child objects and/or valid objects may then be identified based on the remaining, valid relationships. A user may request extension of the RLS policy created for the primary object. After receiving a request indicating the user's selections, the RLS policy may then be extended, e.g., by generating SQL statements to implement the policy on the selected child or parent objects through valid relationships.

Such a system may enable more direct and improved security of data stored on computer systems. The system may also improve the computing systems capabilities by, e.g., enabling the computer to identify valid, related tables and objects and to automatically extend the RLS policy to such objects. Furthermore, the system may be implemented with the user interface that removes the need to generate such RLS policies in code and instead enables non-technical employees to implement such policies.

FIG. 1 depicts a system 100 according to an exemplary embodiment of the present disclosure. The system 100 may be configured to identify valid child objects of a primary object and extend an RLS policy created for the primary object to one or more of the valid child objects. The system 100 includes an RLS extension system 102, and object database 132, and a relationship database 142. The object database 132 stores a plurality of objects, including a primary object 134, child objects 136, 138, and a parent object 137, 139. The relationship database 142 stores a plurality of relationships, including child relationships 144, 146 and parent relationships 148, 150. The RLS extension system 102 includes an RLS policy creator 104, an RLS policy extender 114, and a related object identifier 122. The RLS extension system further includes a CPU 128 and a memory 130. The RLS policy creator 104 includes a data access policy 106 and an RLS policy 108, which includes an access control list (ACL) 110 and SQL statements 112. The RLS policy extender includes an extended RLS policy 116, which includes an ACL 118 and SQL statements 120. The related object identifier 122 includes a valid child relationship 124 and a valid parent relationship 126. The CPU 128 and the memory 130 may implement one or more aspects of the RLS extension system 102, such as the RLS policy creator 104, the RLS policy extender 114, and the related object identifier 122. For example, the memory 130 may store instructions which, when executed by the CPU 128, cause the CPU 128 to perform one or more aspects of the RLS extension system 102.

The object database 132 may be configured to store objects, such as the primary object 134, child objects 136, 138, and parent objects 137, 139. The objects 134, 136, 138, 137, 139 maybe configured to store data. For example, the objects 134, 136, 138, 137, 139 may have corresponding database tables (e.g., SQL tables) that store data. As a further example, the objects 134, 136, 138, 137, 139 may be implemented as SmartBox objects provided within a K2® platform. The objects 134, 136, 138, 137, 139 may alternatively be implemented as database tables themselves. For example, the objects 134, 136, 138, 137, 139 may be implemented as SQL tables. In preferred embodiments, the primary objects 134, child objects 136, 138, and parent object 137, 139 may be implemented as the same type of objects (e.g., all are implemented as SmartBox objects or all are implemented as SQL tables). Although as depicted in the object database 132 includes one primary object 134, two child objects 136, 138, and one parent object 137, 139, other implementations are possible. For example, the object database 132 may store many more objects 134, 136, 138, 137, 139 (e.g., tens or hundreds of objects 134, 136, 138, 137, 139). The object database 132 may be implemented by, e.g., a SQL database or a K2® platform database.

The primary object 134 may be the object for which an RLS policy 108 is expressly created. For example, as explained below, the user may expressly create a data access policy 106 for the primary object 134 before extending a policy to other objects 136, 138, 137, 139 in the object database 132. Child objects 136, 138 may depend on data stored within the primary object 134. For example, child objects 136, 138 may store data for which access is controlled based on the contents of data stored within the primary object 134 or may include one or more fields that correspond to further data stored within the primary object 134. The parent object 137, 139 may store data on which the primary object 134 depends. For example, the primary object 134 may store data for which access is controlled based on the contents of the data stored within the parent object 137, 139.

The relationship database 142 may be configured to store relationship indications between objects 134, 136, 138, 137, 139. For example, the relationship database 142 may store child relationships 144, 146 between child objects 136, 138 and the primary object 134 and parent relationships 148, 150 between the primary object 134 and a parent object 137, 139. The relationships 144, 146, 148, 150 may identify a parent and a child within the relationship 144, 146, 148, 150. For example, the child relationships 144, 146 may identify the primary object 134 as a parent and child objects 136, 138 as a child. As another example, the parent relationships 148, 150 may identify the primary object 134 as a child and a parent object 137, 139 as a parent. In certain implementations, the relationships 144, 146, 148, 150 may be implemented as the same type of relationship. For example, the relationships 144, 146, 148, 150 may be implemented as primary key-foreign key relationships. In certain implementations, the relationships 144, 146, 148, 150 may indicate one or more properties or fields from the objects 134, 136, 138, 137, 139 on which the relationships 144, 146, 148, 150 are based. In implementations where the relationships 144, 146, 140, 150 are stored as the same type of relationship, the relationship database 142 may not expressly distinguish between child relationships 144, 146 and parent relationships 148, 150. Rather, such terminology may be considered as used for simplicity and clarity within the present specification and may be used relative to the primary object 134. Stated differently, the child relationships 144, 146 may be considered relative to primary object 134 and parent relationships 148, 150 may be considered relative to the primary object 134. Accordingly, although the relationship database 142 is only depicted as storing child relationships 144, 146 and parent relationships 148, 150, the relationship database 142 may store additional relationships, e.g., relationships not including the primary object 134.

The RLS policy extender 102 may be configured to create and extend an RLS policy 108 from a primary object 134 to related objects 136, 138, 137, 139. In light of that, the RLS policy creator 104 may be configured to create an RLS policy 108 based on the data access policy 106. A user may provide the data access policy 106 to the RLS policy creator 104. For example, the user may create the data access policy 106 within a user interface of the RLS extension system 102 for application to the primary object 134. In certain implementations, the data access policy 106 may be less formal than the RLS policy. For example, rather than relying on the user to create or manually program the RLS policy 108, the data access policy may instead rely on business logic or other indications entered through a user interface. The data access policy 106 may include access permissions. The access permissions may be specified on a per-user level, or on a group level (e.g., specified by user role or position). Additionally, the access permissions may identify access levels granted on a per-row basis, or may specify one or more criteria for access (e.g., access is predicated on membership within a certain group, or that certain groups or users have access to rows that meet a given criteria).

The access permissions within the data access policy 106 may specify differing levels of access. For example, the data access policy 106 may include a full access policy that grants certain users or groups full access to data within the primary object 134, or certain rows within the primary object 134. In another example, the data access policy 106 may include a limited access policy that grants certain users or groups access to data within the primary object 134 based on data stored within another object 136, 138, 137, 139 of the object database 132. For example, if the object database 132 stores one or more objects 134, 136, 138, 137, 139 relating to a ticketing system, it may be advantageous to provide full access to a support manager of the ticketing system to enable quick resolution of technical or customer support issues. However, for security reasons, it may be preferable to limit access using a limited access policy for individual support staff members so that the individual staff members can only access specific support tickets that have been assigned to them (e.g., their user ID).

Although the data access policy 106 may specify the desired access policies for application to the primary object 134, the data access policy 106 may not be provided in a format that can be used for application or enforcement within the object database 132. Therefore, the RLS policy creator 104 may generate an RLS policy 108 that reflects the excess policies indicated within the data access policy 106. For example, in implementations involving SQL databases, the RLS policy 108 may be generated to include an ACL 110 and SQL statements 112. The ACL 110 may specify each user granted access (e.g., full or limited access) and the rows, or determining criteria for each row, that the user can access. In certain embodiments, the ACL 110 may also designate zero users granted access, which may block access to the primary object 134 for all users. SQL statements 112 may implement the RLS policy 108 within the object database 132 (e.g., apply the access controls indicated by the ACL 110).

The related object identifier 122 may be configured to identify a valid child relationship 124 and/or a valid parent relationship 126 of the primary object 134. For example, the related object identifier 122 may analyze the child relationships 144, 146 of the relationship database 142 for valid child relationships 124 and may analyze the parent relationships 148, 150 of the relationship database 142 for valid parent relationships 126. In particular, the valid relationships 124, 126 may be identified by analyzing one or more of the relationships 144, 146, 148, 150 to identify and remove invalid relationships, e.g., relationships that are forbidden, circular, and/or duplicative. The valid relationships 124, 126 may be used to identify a child or parent object 136, 138, 137, 139 of the primary object 134 within the object database 132.

The RLS policy extender 114 may be configured to extend the RLS policy 108 to one or more of the child or parent objects 136, 130, 137, 139 identified by the related object identifier 122. For example, based on the RLS policy 108, the RLS policy extender 114 may generate an extended RLS policy 116, adapted to the child or parent object 136, 138, 137, 139. In particular, the extended RLS policy 116 may include an ACL 118 that applies the ACL 110 of the RLS policy 108 to the child or parent object 136, 13, 137, 139 and SQL statements 120 that apply the SQL statements 112 of the RLS policy 108 to the child or parent object 136, 138, 137, 139. In certain implementations, the extended RLS policy 116 may differ from the RLS policy 108 in that data stored within the child or parent objects 136, 138, 137, 139 may differ from the data stored within the primary object 134 in content or in type. As another example, the RLS policy 108 may be used to generate an extended RLS policy 116 for the child object 136. Based on the data access policy 106, certain users may not have access to data stored within the child object 136 (e.g., because the data access policy 106 includes a limited access policy restricting access to data stored within the child object 136 for certain users based on data stored within the primary object 134). Therefore, although a user may have access to certain rows within the primary object 134, 136, the user may not be able to access corresponding data within the child object 136. Accordingly, the ACL 118 and/or the SQL statements 120 of the extended RLS policy 116 may be adapted when generated by the RLS policy extender 114 to enforce such a policy.

Figure 2:
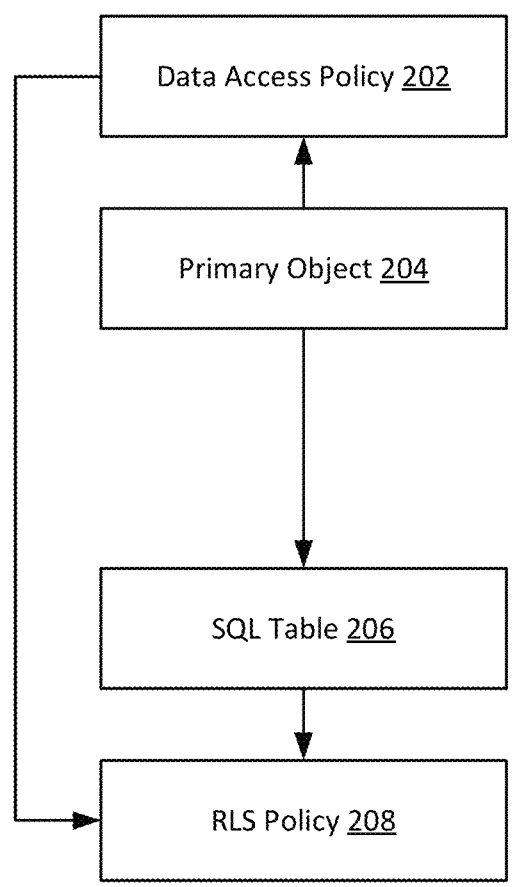
FIG. 2 illustrates a policy association according to an exemplary embodiment of the present disclosure.

FIG. 2 depicts a policy association 200 according to an exemplary embodiment of the present disclosure. The policy association 200 may reflect data storage and policy relationship and enforcement implementation for a primary object in certain implementations. For example, the policy association 200 may depict one such implementation for the primary object 134 of the system 100.

The policy association 200 includes a primary object 204, the data access policy 202, a SQL table 206, and an RLS policy 208. The primary object 204 may reflect a primary object from the object database, such as the primary object 134 from the object database 132. The primary object 204 may be used within a broader computing system (e.g., a K2® system) to reference and manipulate data stored within the system. In particular, the primary object 204 has a corresponding SQL table 206. The SQL table 206 may store the data corresponding to the primary object 204. For example, the primary object 204 may store data in a one-to-one relationship with the SQL table 206 (e.g., with the same rows and columns, or with indicators to the rows and columns of the SQL table 206). Data may be stored within the SQL table 206 in rows, with one or more rows containing sensitive information which necessitates access restrictions. The corresponding relationship between the primary object 204 and the SQL table 206 may indicate that references to the primary object 204 also refer to the SQL table 206, and that operations applied to the primary object 204 also apply to the SQL table 206 (e.g., to data stored within the SQL table 206).

The primary object 204 may also be used to generate, manipulate, and update security policies related to the stored data. In particular, the primary object 204 includes the corresponding data access policy 202. The data access policy 202 may be an example of the data access policy 106 and accordingly may contain a less formal description (e.g., a description not requiring SQL statements or code) of a user's desired access controls for data stored within the primary object 204 (e.g., within the SQL table 206). The corresponding relationship between the primary object 204 and the data access policy 202 may indicate that references to the primary object 204 may be used to manipulate or create the data access policy 202.

After the data access policy 202 is created or updated for the primary object 204, a corresponding RLS policy 208 may be generated to implement the data access policy 202 on the SQL table 206. For example, the RLS policy 208 may be created in response to a user creating the data access policy 202 for the primary object 204. The RLS policy 208 may be an example implementation of the RLS policy 108 and may therefore include an ACL 110 or SQL statements 112. Adjustments to the data access policy 202 may be updated or reflected within the RLS policy 208.

Figure 3:
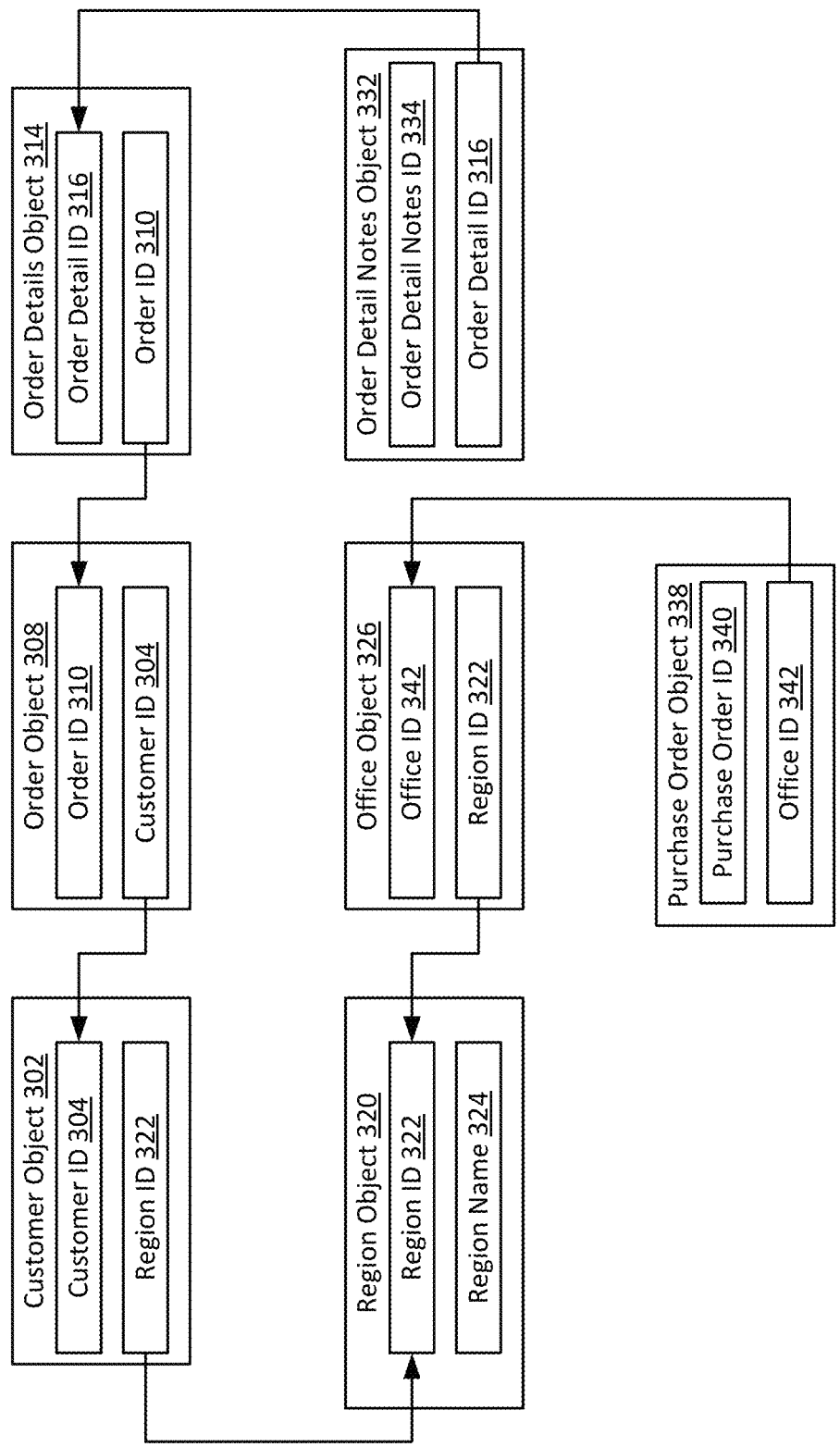
FIG. 3 illustrates an object schema according to an exemplary embodiment of the present disclosure.

FIG. 3 depicts an object schema 300 according to an exemplary embodiment of the present disclosure. The object schema 300 may depict one example of organizing objects storing different types of data in a relational manner. In particular, the object schema 300 may be used to store data of different types related to a sales system in tables with data of the same type. For example, the object schema 300 includes a purchase order object 338, an office object 326, a region object 320, a customer object 302, an order object 308, an order details object 314, and an order detail notes object 332. The purchase order object 338 may store information about purchase orders with a corresponding purchase order ID 340 for each purchase order. The purchase order object 338 may also store an office ID 342 for certain purchase orders, such as an identifier of a corresponding office responsible for the purchase order. The office object 326 may then store further information regarding the offices corresponding to each office ID 342, as well as a corresponding region ID 322. The region object 320 may store further information regarding each region with a region ID 322, such as a region name 324 for each region ID 322. The customer object 302 may store information regarding customers along with a customer ID 304, such as a corresponding region for one or more of the customer IDs 304 according to a region ID 322. The order object 308 may store information regarding received orders along with an order ID 310 identification and a corresponding customer ID 304. The order details object 314 may store an order detail ID 316 in connection with additional order details regarding an order indicated by an order ID 310. The order detail notes object 332 may further store order detail notes along with an order detail notes ID 334 and an order detail IDs 316. Each of the above objects 302, 308, 314, 320, 326, 332, 338 may store their corresponding information within a database table, such as a SQL table 206 corresponding to each object 302, 308, 314, 320, 326, 332, 338.

FIG. 3 depicts relationships between the objects via arrows, which indicate how the data in one object depends on data from another. In particular, the arrows depicted in FIG. 3 point from child to parent. For example, the purchase order object 338 is a child of the office object 326. The office object 326 is a child of the region object 320. The order detail notes object 332 is a child of the order details object 314. The order details object 314 is a child of the order object 308. The order object 308 is a child of the customer object 302. The customer object 302 is a child of the region object 320. Additionally, the arrows connect the properties of each object 302, 308, 314, 320, 326, 332, 338 that correspond to each relationship. For example, the order detail notes object 332 is a child of the order details object 314 by virtue of the order detail ID 316 property. As mentioned above, an object 302, 308, 314, 320, 326, 332, 338 may be a parent object 137, 139 relative to one primary object 134, 204 and may be a child object 136, 138 relative to another primary object 134, 204. In particular, the office object 326 is a parent object 137, 139 relative to the purchase order object 338, and is a child object 136, 138 relative to the region object 320. Other relationships are possible as well, including multiple child objects 136, 138. For example, as depicted, the region object 320 is a parent object 137, 139 relative to both the office object 326 and the customer object 302. Similarly, although not depicted in FIG. 3, in certain embodiments, an object 302, 308, 314, 320, 326, 332, 338 may have more than one parent object 137, 139.

In certain implementations, the relationships between objects may indicate that access to data stored within one object is predicated on data stored within another object in the relationship. For example, as depicted, access to data stored within a child object 136, 138 may be controlled by data stored within a parent object 137, 139 of the relationship. As a further example, access to data stored within the order details object 314 may be controlled by data stored within the order object 308. For instance, access to a given order detail ID 316 may require that a user have access to a corresponding order ID 310 within the order object 308. Such an implementation may be useful to enable, e.g., a member of a sales staff responsible for an order to access data corresponding to their orders while also protecting the privacy of other, unrelated order detail IDs 316 in the order details object 314.

Figure 4:
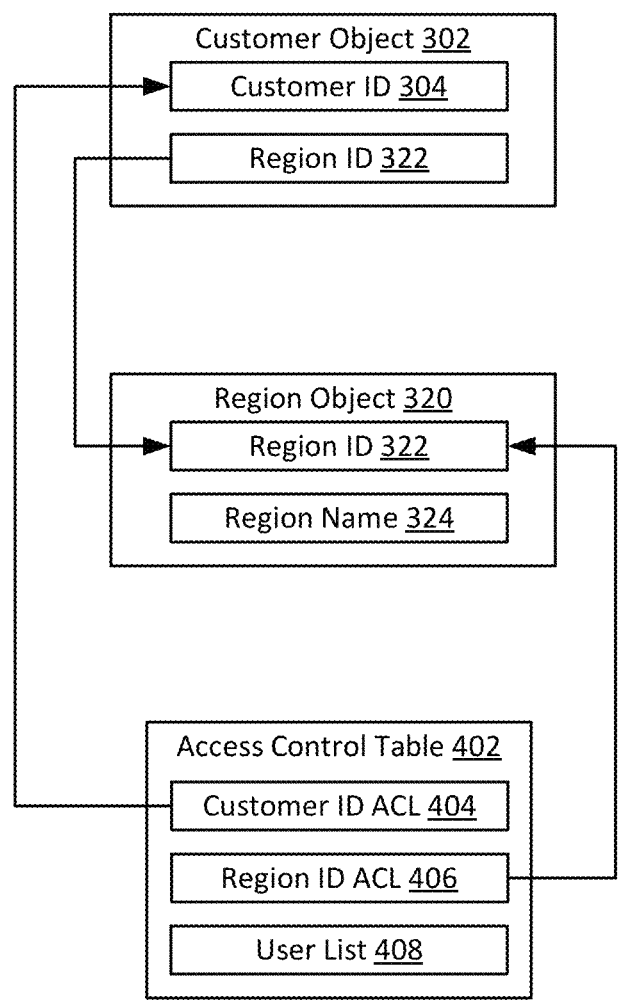
FIG. 4 illustrates an access control table association according to an exemplary embodiments of the present disclosure.

FIG. 4 depicts an access control table association 400 according to an exemplary embodiment of the present disclosure. The access control table association 400 may represent an implementation for using an access control table to control access to multiple objects, such as the objects 302, 308, 314, 320, 326, 332, 338 of the object schema 300. The access control table association 400 includes the customer object 302, the region object 320, and an access control table 402. The access control table 402 includes a customer ID ACL 404, a region ID ACL 406, and a user list 408.

The access control table 402 make store multiple ACLs, such as the customer ID ACL 404 and the region ID ACL 406. The ACLs may control access to data stored in a corresponding object. For example, as indicated in FIG. 4, the customer ID ACL 404 relates to the customer ID 304 of the customer object 302. The customer ID ACL 404 may therefore control access to data stored within the customer object 302 (e.g., control access to the data based on the customer ID 304). Similarly, the region ID ACL 406 relates to the region ID 322 of the region object 320. The region ID ACL 406 may therefore control access to data stored within the region object 320 (e.g., based on the region ID 322). The user list 408 may store a list of users and other associated identifiers (e.g., user names, user IDs, group membership, role/job responsibilities). A user or service may be able to query the user list 408 with an identifier, and the user list 408 may return a name and a pre-designated format (e.g., a fully-qualified name (FQN) of the user associated with the provided identifier. In certain implementations, users may be identified within the ACLs 404, 406 based on the pre-designated format to have a consistent user identifier across inquiries and use cases, and to more reliably control access on a per-user basis.

The ACLs 404, 406 may include one or more full access policies and limited access policies. For example, the customer ID ACL 404 may include a limited access policy that predicates access to data stored within the customer object 302 on a user having access to corresponding data within the region object 320. The access control table 402 may enforce this policy by comparing the customer ID ACL 404 with the region ID ACL 406. For example, responsive to receiving a request for access to a customer ID 304 by a user with the provided user identifier, the access control table 402 may query the user list 408 for a standard user identifier and may check the customer ID ACL 404 and determine that access to the requested customer ID 304 require access to a corresponding region (e.g., region ID 322) within the region object 320. The access control table 402 may then query the customer object 302 for the region ID 322 corresponding to the requested customer ID 304 and may then determine, based on the region ID ACL 406, whether the requesting user has access to the corresponding region ID 322 within the region object 320. If the requesting user is authorized to access the corresponding region ID 322, the access control table 402 may return a Boolean indicating that the user is authorized to access the requested customer ID 304 to the customer object 302, which may provide the requested data or other data (e.g., metadata such as a last edit time of the requested row) to the requesting user. In certain implementations, the access indicator may also indicate a level of access (e.g., read access, write access, read and write access, or restricted metadata access)

Figure 5C:
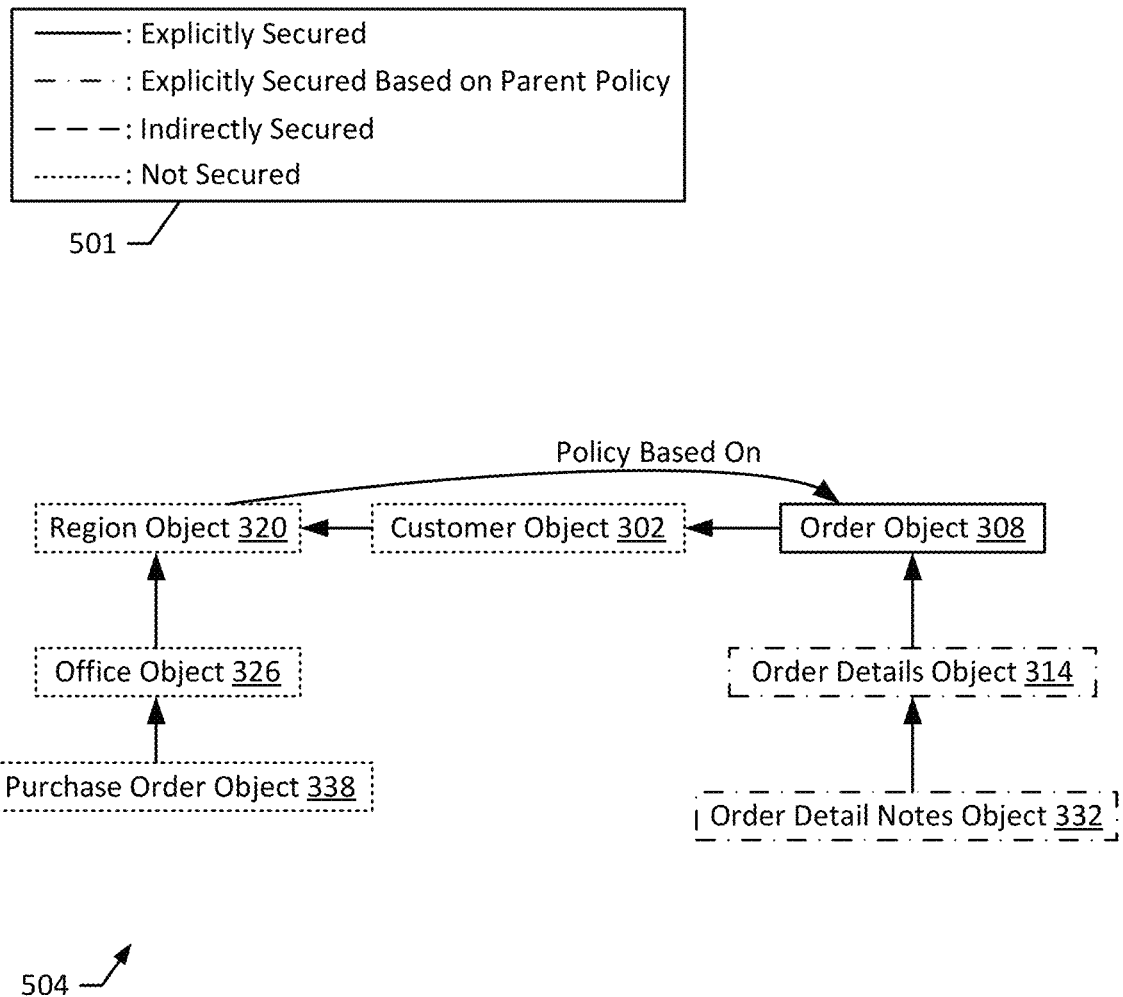

FIGS. 5A-5C depict object security states 500, 502, 504 according to exemplary embodiments of the present disclosure. The object security states 500, 502, 504 depict examples of how an object may be secured based on data access policies 106, 202, including RLS policies 108, 208. Each of the security states 500, 502, 504 uses visual indications around the border of each depicted object 302, 308, 314, 320, 326, 302, 338 to indicate the security states of each object 302, 308, 314, 320, 326, 302, 338 according to the legend 501. The depicted object security states 500, 502, 504 are based on the object schema 300 discussed above, although other examples and implementations are possible.

FIG. 5A depicts the object security state 500, in which the customer object 302 is explicitly secured by a data access policy 106, 202, e.g., by an RLS policy 108, 208 generated based on the data access policy 106, 202. In certain implementations, the data access policy 106, 202 may include a limited access policy, such as providing access to data stored within the customer object 302 based on data stored within the region object 320. Similarly, access to data stored within the order object 308, the order details object 314, and the order detail notes object 332 may require a requesting user to have access to a corresponding customer ID 304 within the customer object 302. Based on these requirements, the order object 308, the order details object 314, and the order detail notes object 332 may therefore be indirectly secured by the access restrictions explicitly applied to the customer object 302 by the data access policy 106, 202. However, the order object 308, order details object 314, and order detail notes object 332 may lack a data access policy 106, 202 or an RLS policy 108, 208 of their own. As discussed above, such an indirect securing of the order object 308, the order details object 314, and the order detail notes object 332 may be inferior because such implementations are harder to audit when confirming coverage, less secure, and less granular.

Additionally, the region object 320, the office object 326, and the purchase order object 338 are not secured, meaning access to the rows of data stored within these objects may not be restricted by users in the depicted examples. These objects 320, 326, 338 are similarly not restricted in FIG. 5B depicts the object security state 502, in which the customer object 302 is still explicitly secured by the data access policy 106, 202. However, the order object 308, the order details object 314, and the order detail notes object 332 are also explicitly secured. As indicated in the legend 501, the order object 308, the order details object 314, and the order detail notes object 332 are explicitly secured by security policies, e.g., extended RLS policies 116, based on the data access policy 106, 202 of their parent object 137, 139, the customer object 302. For example, the extended RLS policies 116 explicitly protecting the order object 308, order details object 314, and order detail notes object 332 may be generated based on the data access policy 106, 202 or RLS policy 108, 208 applicable to the customer object 302.

Explicitly securing the objects 308, 314, 332 in this manner may be superior for multiple reasons. For example, such explicit security implementations may be easier to audit, as each object 302, 308, 314, 332 has its own RLS policy 108, 208, 116 which can be independently identified and analyzed. Such implementations may also be more secure, as each object 302, 308, 314, 332 is now independently secured, so an error in one object 302, 308, 314, 332 will not inherently compromise the security of the remaining objects 302, 308, 314, 332. Additionally, as each object 302, 308, 314, 332 has its own explicit policy, control may be more granular. For example, the user can be granted access to a row in, e.g., the order object 308 without automatically or necessarily granting the user access to a corresponding row of the order details 314.

To transition from table security state 500 to table security state 502, in existing systems users may typically manually step through each table, identify dependencies and relationships, and create new RLS policies 108, 208 applicable to the identified related objects. As explained further herein, the present system can automatically identify child and parent objects 136, 138, 137, 139 of a given primary object 134, 204 and can generate extended RLS policies 116 for selected parent or child objects 136, 138, 137, 139, without requiring such manual efforts for the database administrator. In particular, systems such as the system 100 according to the present disclosure may automatically identify child and parent objects 136, 138, 137, 139 of the customer object 302 and generate extended RLS policies for selected child objects 136, 138, such as the order object 308, the order details object 314, and the order detail notes object 332.

FIG. 5C depicts a table security state 504, in which the order object 308 is explicitly secured by a data access policy 106, 202 that relies on data stored within the region object 320. Such a security policy may be advantageous to simplify security deployment where relevant data is not located in an immediate parent object 137, 139 of the primary object 134, 204. For example, in the table security state 504, it may be advantageous for, e.g., a regional sales supervisor to be able to access and review orders in a region they supervise. In such an implementation, it may be preferable to base such users' access to certain rows of the order object 308 on data stored within the region object 320. For example, it may be unduly cumbersome to step through each corresponding customer ID 304 and the customer object 302 for each region ID 322 in the region object 320 when creating the data access policy 106, 202, or certain customers may span multiple regions, which may further complicate the data access policy. Therefore, the present system may enable generating an RLS policy 108, 208 from a data access policy 106, 202 specifying a parent object 137, 139 such as the region object 320 or the office object 326 that is two or levels above the primary object 134, such as the order object 308.

Figure 6:
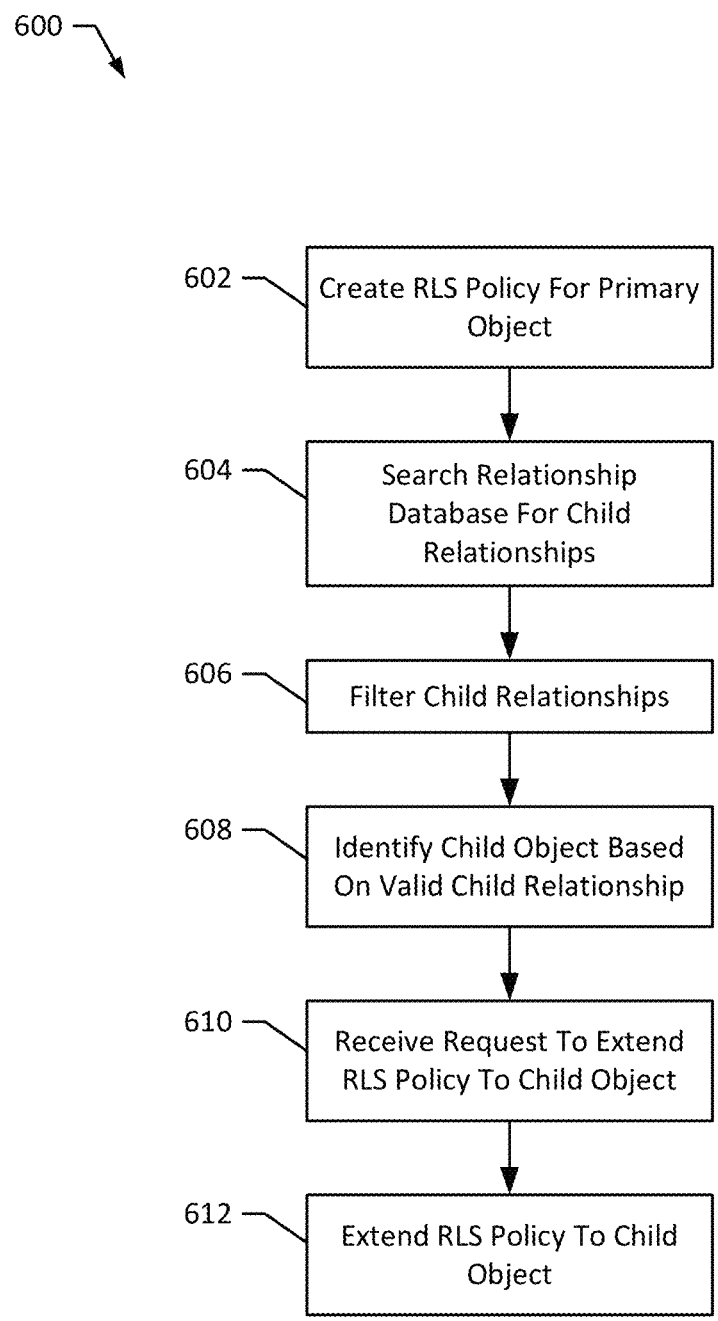
FIG. 6 illustrates a method according to an exemplary embodiment of the present disclosure.

FIG. 6 depicts a method 600 according to exemplary embodiments of the present disclosure. The method 600 may be performed to automatically identify child objects 136, 138 of the primary object 134, 204 and to extend an RLS policy 108, 208 to the selected child objects 136, 138. For example, the method 600 may be performed by the system 100 to implement one or more of the functionalities of, e.g., the RLS extension system 102, the RLS policy creator 104, the RLS policy extender 114, the related object identifier 122, the object database 132, and the relationship database 142. The method 600 may be implemented on a computer system, such as the system 100. For example, method 600 may be implemented by the RLS extension system 102. The method 600 may also be implemented by a set of instructions stored on a computer readable medium that, when executed by a processor, cause the computer system to perform the method. For example, all or part of the method 600 may be implemented by the CPU 128 and the memory 130. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with the RLS policy creator 104 creating an RLS policy 108 for the primary object 134, 204 (block 602). For example, in the object security state 502, responsive to receiving a data access policy 106, 202, the RLS policy creator 104 may create an RLS policy 108, 208 for the customer object 302. In certain implementations, the data access policy 106, 202 may specify the primary object 134, 204 for which the RLS policy 108 is to be designated (e.g., the customer object 302). In generating the RLS policy 108, the RLS policy creator 104 may generate a corresponding ACL 110 and SQL statements 112 implementing the data access policy 106 on the primary object 134, 204 (e.g., on a corresponding SQL table 106 storing the data for the primary object 134, 204). A specific example of such an ACL 110 and SQL statements 112 is presented below.

The related object identifier 122 may then search for child relationships 144, 146 of the primary object 134, 204 (block 604). For example, the related object identifier 122 may search a relationship database 142 for child relationships 144, 146 of the primary object 134 (e.g., relationships 144, 146, 148, 150 that designate the primary object 134 as a parent). In certain implementations, the related object identifier 122 may search for additional child objects 136, 138 beyond first-level child relationships 144, 146. For example, after identifying first-level child objects 136, 138 of the primary object 134, the related object identifier 122 may search for further child relationships 144, 146 of the identified first-level child objects 136, 138. Such a search may identify one or more second-level child objects 136, 138. The related object identifier 122 may continue the search through multiple levels of relationships 144, 146, 140, 150. For example, in searching for child objects 136, 138 of the customer object 302, the related object identifier 122 may identify a child relationship 144, 146 between the customer object 302 and the order object 308 indicating that the customer object 302 is a parent of the order object 308. The related object identifier 122 may accordingly identify the order object 308 as a potential first-level child object 136, 138 of the customer object 302 via the child relationship 144, 146. The related object identifier 122 may then search for child relationships 144, 146 of the order object 308 and may identify a relationship indicating that the order object 308 is a parent object 137, 139 of the order details object 314. Accordingly, the related object identifier 122 may identify the order details object 314 as a second-level child of the customer object 302. In the same way, the related object identifier 122 may identify that the order detail notes object 332 is a third-level child of the customer object 302. In certain implementations, the depth level of such a search for child relationships 144, 146 may be limited to a fixed number (e.g., 10 levels). In still further implementations, the depth level may be user-configurable, e.g., via a user interface.

After identifying the child relationships of the primary object 134, 204, the related object identifier 122 may then filter the child relationships 144, 146 to identify one or more valid child relationships 124 (block 606). To identify the valid child relationships 124, the related object identifier 122 may filter the child relationships 144, 146 to ensure, e.g., security integrity, to ensure that the same object is not identified multiple times, to ensure that circular relationships resulting from additional relationships 144, 146, 148, 150 within the relationship database 142 do not create recursive issues, and to ensure compatibility according to one or more requirements of the implementing RLS system. To filter the child relationships 144, 146 and the related object identifier 122 may analyze each of the identified child relationships 144, 146 by, e.g., (i) determining whether each of the one or more child relationships 144, 146 is valid or invalid, and (ii) removing each invalid child relationship 144, 146. In performing the analysis, the related object identifier 122 may create a tree structure reflecting each of the analyzed child relationships 144, 146, e.g., identifying parent objects 137, 139 as above corresponding child objects 136, 138 in the tree structure, with a link between the two.

The related object identifier 122 may then analyze the relationships and/or the tree structure for invalid relationship, including forbidden, circular, and/or duplicative relationships. Forbidden relationships may include relationships 144, 146, 148, 150 that would create one or more operational or security concerns. For example, forbidden relationships may include relationships with both multiple parent objects 137, 139 and multiple child objects 136, 138, relationships 144, 146, 148, 150 that include a parent objects 137, 139 of a different type than the child object 136, 138, or relationships 144, 146, 148, 150 that include child objects 136, 138 or parent objects 137, 139 with related encrypted properties. Further examples of forbidden relationships may include relationships that indicate more than one property related between a parent object 137, 139 and a child object 136, 138 and/or relationships 144, 146, 148, 150 that identify a corresponding property of the parent object 137, 139 and the child object 136, 138 that is of a different type, size, and/or precision. For example, a fixed-length text field in the parent object 137, 139 may be required to correspond to a fixed-length text field in the child object 136, 138 of the same size. As another example, a decimal property with certain precision and/or time properties in the child object 136, 138 may be required to correspond to a decimal property with the same precision and/or time properties in the parent object 137, 139.

Duplicative relationships may include relationships 144, 146, 148, 150 that refer to child objects 136, 138 that are already subject to an extended RLS policy 116, or that are already reflected in other child relationships 144, 146. For example, duplicative relationships may include relationships 144, 146, 148, 150 that the related object identifier 122 determines refer to child objects 136, 138 with an associated RLS policy 108 or extended RLS policy 116. As another example, duplicative relationships may also include relationships 144, 146, 148, 150 that relates to a child object 136, 138 with more than one relationship path to the primary object 134, 204. If, for instance, a second-level child object 136, 138 has two parent objects 137, 139, both of which are first-level child objects 136, 138 of the primary object 134, 204, there may be two relationship paths between the primary object 134 and the second-level child object 136, 138: one via the first first-level child object 136, 138 and one via the second first-level child object 136, 138. In such instances, the user may be presented with a selection between all such paths and may be requested to select the path via which the second-level child object 136, 138 should receive the extended RLS policy 116.

Circular relationships may include relationships 144, 146, 148, 150 that, in combination with one or more other relationships 144, 146, 148, 150 serve to form a relationship path from one object 134, 136, 138, 137, 139, 204, 302, 308, 314, 320, 326, 332, 338 back to itself. For example, circular relationships may form a relationship path from the primary object 134 back to itself. As another example, if, in combination with the relationships depicted in the object schema 300, the relationship database 142 included a child relationship 144, 146 identifying the customer object 302 as a child of the order details object 314, the related object identifier 122 may identify that relationship between the customer object 302 in the order details object 314 as a circular relationship. In combination with the other relationships depicted with the table schema 300, such a relationship would form a circularity, i.e., with the customer object 302 a parent of the order object 308, which is a parent of the order details object 314, which would then, as a result of the circular relationship, also be a parent of the customer object 302.

The related object identifier 122 may identify the valid child relationships 124 as the child relationships 144, 146 that remain after removing the invalid relationships according to the criteria described above.

The related object identifier 122 may then identify child objects 136, 138 valid child relationships 124 (block 608). The related object identifier 122 may identify the child objects 136, 138 as the objects 136, 138, 137, 139, 204, 302, 308, 314, 320, 326, 332, 338 stored in the object database 132 that have a valid child relationship 124 with the primary object 134. For example, within the table schema 300, the child objects 136, 138 of the customer object 302 may include the order object 308, the order details object 314, and the order detail notes object 332.

The RLS policy extender 114 may then receive a request to extend the RLS policy 108 to one or more of the identified child objects 136, 138 (block 610). For example, the request may be received from a user via a user interface. In such embodiments, the user interface may present the identified child objects 136, 138 to the user in the user may select from the child objects 136, 138 to which the RLS policy 108 should be extended. The user may select one of the child objects 136, 138, or may select a plurality of the child objects 136, 138. In implementations where only one child object 136, 138 is identified at block 608, the user may select the identified child object 136, 138. In implementations where a plurality of child objects 136, 138 identified at block 608, the user may select, e.g., all of or a subset of the identified child objects 136, 138. In certain implementations, this step may be optional. For example, the RLS policy extender 114 may be configured to automatically extend the RLS policy 108.

Responsive to receiving the request, the RLS policy extender 114 may then extend the RLS policy 108 to the selected child objects 136, 138 (block 612). For example, the RLS policy extender 114 may generate an extended RLS policy 116, which applies the data access policy 106 and the RLS policy 108 to the selected child objects 136, 138. After generating the extended RLS policy 116, the RLS policy extender 114 may create a policy record in the primary object 134 or the selected child objects 136, 138 indicating that extended RLS policy 116 was generated and applies to the selected child object 136, 138. In implementations where the selected child object 136, 138 is multiple levels down (e.g., a second-level child object 136, 138), the RLS policy extender 114 may automatically include each intervening child object 136, 138 in order to create and unbroken policy chain between the primary object 134 and the selected child object 136, 138. For example, if the primary object 134 is the customer object 302 and the selected child object 136, 138 is the order details object 314, the RLS policy extender 114 may automatically include the order object 308 in the RLS policy extension (e.g., may generate an additional extended RLS policy 116 for the order object 308). Also, in certain implementations, the RLS policy extender 114 may lock the corresponding relationships (e.g., the valid child relationship 124) after an extended RLS policy 116 been generated and applied. Such an implementation may be desirable to help prevent multiple extended RLS policies 116 from being generated for child objects 136, 138.

FIGS. 7A-7B depict methods 700, 710 according to exemplary embodiments of the present disclosure. The methods 700, 710 may be implemented on a computer system, such as the system 100. For example, methods 700, 710 may be implemented by the RLS extension system 102. The methods 700, 710 may also be implemented by a set of instructions stored on a computer readable medium that, when executed by a processor, cause the computer system to perform the method. For example, all or part of the methods 700, 710 may be implemented by the CPU 128 and the memory 130. Although the examples below are described with reference to the flowchart illustrated in FIGS. 7A-7B, many other methods of performing the acts associated with FIGS. 7A-7B may be used. For example, the order of some of the blocks may be changed, certain blocks may be combined with other blocks, one or more of the blocks may be repeated, and some of the blocks described may be optional.

FIG. 7A depicts a method 700 according to an exemplary embodiment of the present disclosure. The method 700 may be performed to identify a parent object 137, 139 of a primary object 134, 204. For example, the related object identifier 122 may perform the method 700 to identify parent objects 137, 139 stored in the object database 132 based on parent relationships 148, 150 stored in the relationship database 142. In certain implementations, the method 700 may be implemented with methodologies similar or identical to those employed in the method 600. For example, blocks 702-706 may be implemented similarly to blocks 604-608 and may primarily differ in that blocks 702-706 concern parent relationships 148, 150 and parent objects 137, 139 rather than child objects 136, 138 and child relationships 144, 146.

The method 700 may begin with the related object identifier 122 searching the relationship database 142 for parent relationships (block 702). Similar to block 604, the related object identifier 122 may search the relationship database 142 for parent relationships 148, 150 of the primary object 134, 204 (e.g., relationships 144, 146, 148, 150 that designate the primary object 134, 204 as a child). The related object identifier 122 may also iteratively search for parent objects 137, 139 of the primary object 134, 204 by, e.g., iteratively searching for second-level parent objects 137, 139 of first-level parent objects 137, 139. In certain implementations, the user may specify how many levels the related object identifier 122 should search to identify parent relationships 148, 150. However, in certain implementations it may be comparatively more complicated to generate extended RLS policies 116 for parent objects 137, 139 than for child objects 136, 138. For example, every additional parent level may require another join statement within the SQL statements 120, which may reduce system performance and complicate generating the SQL statements 120 for the extended RLS policy 116. Accordingly, the number of levels to search for parent objects 137, 139 may be limited to fewer than the number of levels searched for child objects 136, 138 (e.g., two levels searched for parent objects 137, 139 and ten levels searched for child objects 136, 138).

The related object identifier 122 may then filter the parent relationships 148, 150 to identify one or more valid parent relationships 126 (block 704). Similar to the block 606, the related object identifier 122 may filter the parent relationships 148, 150 by (i) determining whether each of the one or more parent relationships 148, 150 is valid, and (ii) removing each invalid parent relationship. In particular, the related object identifier 122 may analyze the parent relationships 148, 150 (e.g., using a tree structure) to identify invalid relationships, such as forbidden, circular, and/or duplicative relationships. Each of the exemplary relationships discussed above in connection with block 606 may similarly be searched by the related object identifier 122 while performing block 704. Additionally, the related object identifier 122 may identify the valid parent relationships 126 as the parent relationships 148, 150 that remain after removing the invalid relationships.

The related object identifier 122 may then identify one or more parent object 137, 139 of the primary object 134 based the one or more valid parent relationships 126 (block 706). The related object identifier 122 may identify the parent objects 137, 139 as the objects 136, 138, 137, 139, 204, 302, 308, 314, 320, 326, 332, 338 stored in the object database 132 that have a valid parent relationship 126 with the primary object 134. For example, within the table schema 300, the parent objects 137, 139 of the order object 308 may include the customer object 302 and the region object 320.

Although not depicted, after the parent object 137, 139 is identified, the RLS policy extender 114 may then receive a request to extend the RLS policy 108 to the parent object 137, 139. This request may be received and processed similarly to block 610 (e.g., via a user interface). The RLS policy extender 114 may accordingly generate an extended RLS policy 116 for the parent object based on the data access policy 106 and/or the RLS policy 108, similarly to block 612.

FIG. 7B depicts a method 710 according to an exemplary embodiment of the present disclosure. The method 710 may be performed to update an RLS policy 108 for a primary object 134, 204 and to update a corresponding extended RLS policy 116 of a related object, such as a child object 136, 138 or a parent object 137, 139. In particular, the method 710 may be performed to update a corresponding extended RLS policy 116 for each related object with an extended RLS policy 116 based on the RLS policy 108 of the primary object 134.

The method 710 may begin by receiving a request to update the RLS policy 108 of the primary object 134 (block 712). The request may be received from a user, e.g., via a user interface. The request may indicate a new data access policy 106 to apply to the primary object 134, or may indicate changes to a pre-existing data access policy 106. As an example, the request to update the RLS policy 108 may include users or groups able to access data within the primary object 134.

Based on the received request, the RLS policy creator 104 may create an updated RLS policy (block 714). The updated RLS policy may include an ACL and SQL statements, similar to the RLS policy 108 and the extended RLS policy 116. If the request provided a new data access policy 106, the RLS policy creator 104 may generate a completely new updated RLS policy from the received new data access policy 106. If the received request instead specifies updates to a previous data access policy 106, the RLS policy creator 104 may instead update an existing RLS policy 108 to reflect the changes identified in the request.

The RLS extension system 102 may then extend the updated RLS policy to related objects (block 716). For example, if the primary object 134 had an RLS policy 108 extended to one or more parent objects 137, 139 or child object 136, 138, the RLS policy extender 114 may extend the updated RLS policy to the same parent objects 137, 139 or child objects 136, 138. In particular, the RLS policy extender 114 may make corresponding changes to the extended RLS policy 116 that were made to the RLS policy 108. In particular, if the request provided new data access policy 106, the RLS policy extender 114 may generate a completely new updated extended RLS policy from the updated RLS policy. If instead the received request specifies updates to a previous data access policy 106, the RLS policy extender 114 may update the existing extended RLS policy 116 to reflect the changes identified in the request. In implementations where the RLS policy extender 114 created a policy record corresponding to the extended RLS policy 116, the RLS policy extender 114 may similarly be configured to update the policy record to reflect the updated extended RLS policy 116.

Figure 8A:
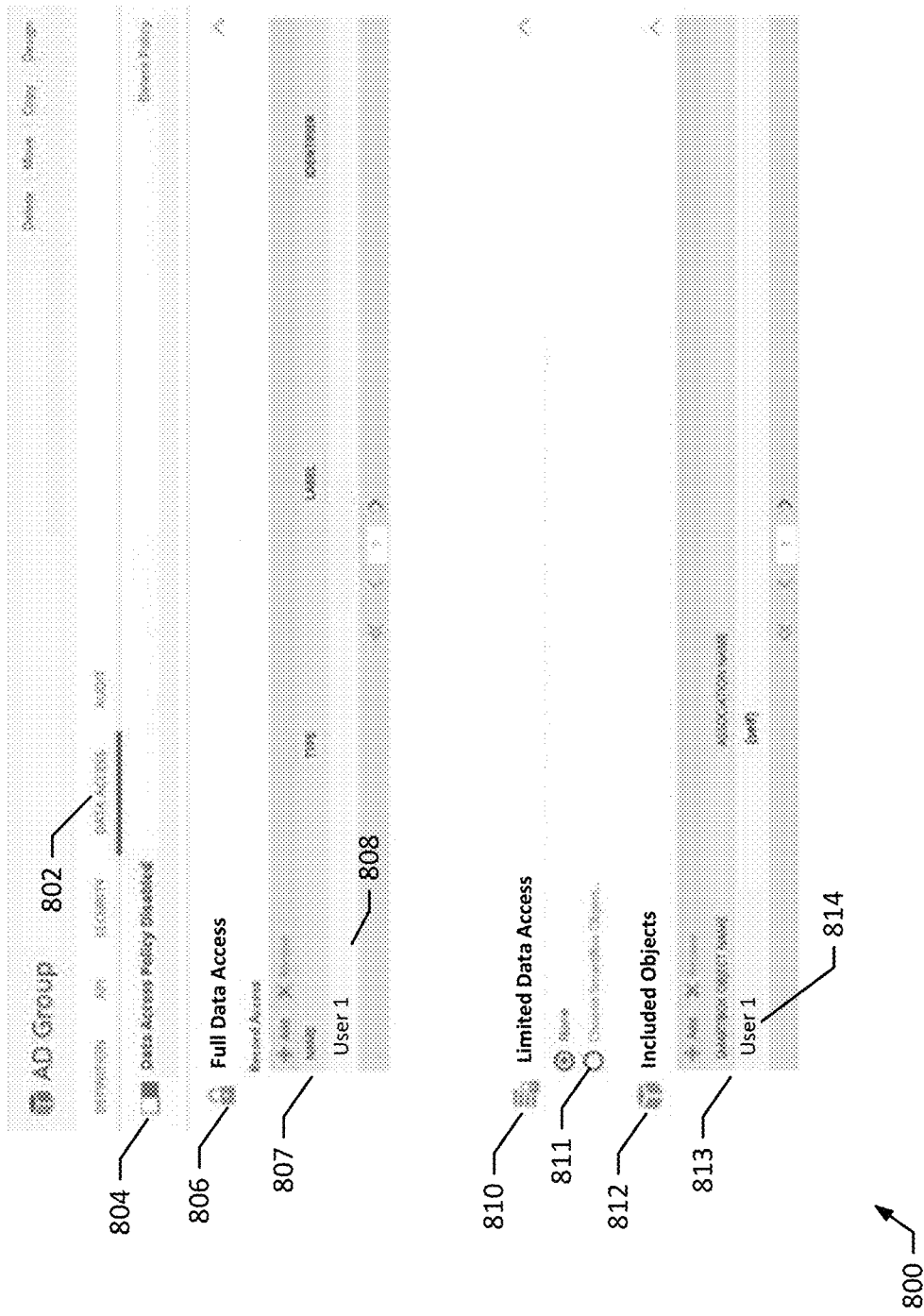
FIGS. 8A-8B illustrate user interfaces according to exemplary embodiments of the present disclosure.

FIG. 8A depicts a user interface according to an exemplary embodiment of the present disclosure. In particular, FIG. 8A depicts a data access policy creation interface 800. The data access policy creation interface 800 may be configured to enable users to create data access policies 106, 202 for use by the system 100. The data access policy creation interface 800 may be displayed on a computing device, e.g., a computer, laptop, tablet computer, smart phone. The data access policy creation interface 800 may be part of a software program that enables database management, such as a K2® database management program. The data access policy creation interface 800 may be accessible via a local application (e.g., an application installed on a user's computing device) or via a web interface (e.g., via a web browser of the user's computing device).

The data access policy creation interface 800 includes a data access tab 802. The data access tab 802 may be selected to select between the data access policy creation interface 800 and other available interfaces (e.g., other available interfaces of the software program). The data access tab 802 includes a data access policy toggle 804. The data access policy toggle 804 may enable or disable data access policies 106, 202 and associated RLS policies 108, 208. When the data access policy toggle 804 is off, a user may be able to set up and generate the data access policies 106, 202 and related RLS policies 108, 208 and see projected effects and applicable objects without having to enforce the policy. In particular, a user may be able to generate an RLS policy 108, 208 and extend the RLS policy 108, 208 by generating an extended RLS policy 116 for parent or child objects 136, 138, 137, 139 of a selected primary object 134. When a user is satisfied with the projected effects of the generated policies, the data access policy toggle 804 may be toggled on in order to enforce the generated policies. By adjusting the data access policy toggle 804, a user may be able to enable and disable, e.g., an RLS policy 108, 208 and related extended RLS policies 116 without having to alter associated ACLs 110, 118, 404, 406. In prior systems, such adjustments would require the user to generate implementing SQL statements.

The data access tab 802 also includes a full access policy creator 806. The full access policy creator 806 may be configured to enable the creation of full access policies 106, 202 for one or more users 808 indicated in the full access table 807 as part of the data access policy 106, 202. As discussed above, full access policies may enable designated users 808 to access every row of a specified primary object 134, 204.

The data access tab 802 also includes a limited access policy creator 810, which may be configured to create one or more limited access policies for the data access policy 106, 202. The limited access policy creator 810 may be used to designate a related object 811 for use in determining whether certain users can access data within a specified primary object 134, 204. For example, after selecting a related object 811, the limited access policy creator 810 may enable selection of one or more users, similar to the users 808 selected for the full access policy creator 806. The limited access policy creator 810 may also enable selection of the criteria used to determine whether a designated user can access the data. For example, the limited access policy creator 810 may enable selection of a portion (e.g., a row or column) of the related object 811 that a user must have access to in order to access related data in the primary object 134, 204.

Once a full access policy and/or a limited access policy been created using the full access policy creator 806 and a limited access policy creator 810, the created policies may be assembled together to form a data access policy 106, 202. For example, once created, the data access policy 106, 202 may be passed to the RLS extension system 102 to generate an RLS policy 108 and extended RLS policy 116.

The data access policy creation interface 800 also includes an included object designator 812 with an included object table 813. The included object table 813 may specify one or more included objects 814 to which the generated data access policies 106, 202 will apply. For example, the included objects 814 may include a designated primary object 134, 204 and one or more child or parent objects 136, 138, 137, 139. After a primary object 134, 204 is designated, a related object selection interface 820 (detailed below) may be used to designate one or more child or parent objects 136, 138, 137, 139 of the primary object 134, 204 for inclusion within the policy (e.g., for which an extended RLS policy 116 is to be generated). Once the one or more child or parent objects 136, 138, 137, 139 are selected, the RLS policy extender 114 may extend RLS policy 108, 208 to the selected one or more child or parent objects 136, 138, 137, 139 by generating an extended RLS policy 116.

Figure 8B:
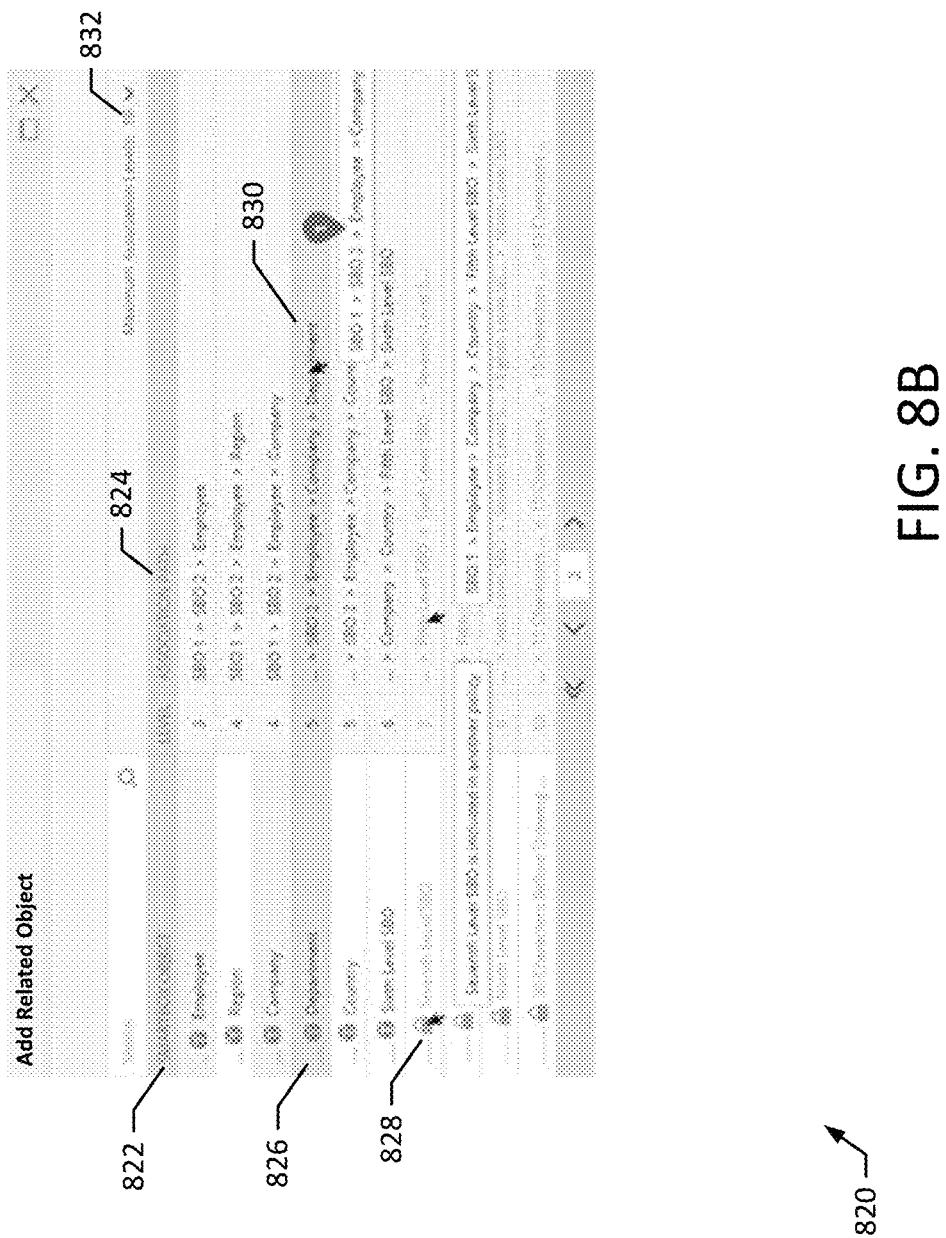

FIG. 8B depicts a related object selection interface 820 according to an exemplary embodiment of the present disclosure. The related object selection interface 820 may be configured to enable users to identify and select one or more child or parent objects 136, 138, 137, 139 of a designated primary object 134, 204. For example, as explained above, the related object selection interface 820 may be used after a primary object 134, 204 is designated within an included object designator 812 of the data access policy creation interface 800. The related object selection interface 820 may be part of a software program that enables database management, such as a K2® database management program. The related object selection interface 820 may be accessible via a local application (e.g., an application installed on a user's computing device) or via the web interface (e.g., via a web browser of the user's computing device). As depicted, the related object selection interface 820 is used to identify child objects 136, 138 of a primary object 134, 204, but some implementations may be used to identify and include parent objects 137, 139 of the primary object 134, 204, e.g., using the systems and methods described above.

The related object selection interface 820 includes a list of child objects 826, 828 in the child object table 822. The child objects 826, 828 may be identified as discussed above, e.g., by the related object identifier 122. In particular, the child object table 822 may include each child object 826, 828 identified up to a designated level of dependency, as discussed above. The level of dependency used may be adjusted using the maximum level designator 832. In particular, each of a parent designated level of dependency and a child designated level of dependency may be set independently. For each identified child object 826, 88, the related object selection interface 820 includes an association path 830 included in the association path table 824. The association path 830 may indicate the intervening relationships between the primary object 134, 204 and the corresponding child object 826, 828. For example, the child object 826 corresponds to the department objects, which is a fifth-level child of the designated primary object 134, 204. The association path 830 may then specify each intervening child object between the primary object 134, 204 and the child object 826 (i.e., the SBO 1 object, the SBO 2 object, the employee object, and the company object). Additionally, certain child objects 828 and corresponding association paths of the child object table 822 and the association path table 824 may be dimmed to indicate that such child objects 828 are already included within the data access policy 106, 202, either as primary objects 134, 204 or as child or parent objects 136, 138, 137, 139. Similarly, the user interfaces 800, 820 and the system 100 may cross-reference attempted data manipulation operations against objects 134, 136, 138, 139, 204, 302, 308, 314, 320, 326, 332, 338 currently used within one or more RLS policies 108, 208 or extended RLS policies 116. In certain implementations, the user interfaces 800, 820 and/pr the system 100 may prevent such operations from taking place because such operations may compromise the security of one or more of the RLS policies 108, 208 or extended RLS policies 116. For example, the system 100 may prevent, or the user interfaces 800, 820 may not make possible, deleting an object 134, 136, 138, 139, 204, 302, 308, 314, 320, 326, 332, 338 or related SQL table 206 on which an RLS policy 108, 208 or extended RLS policy 116 is based (e.g., the region object 320 in security state 504). In another example, the system 100 may prevent deletion or manipulation of a specific row or rows within an object 134, 136, 138, 139, 204, 302, 308, 314, 320, 326, 332, 338 or related SQL table 206 on which the RLS policy 108, 208 or extended RLS policy 116 is based.

User interfaces such as the data access policy creation interface 800 and the related object selection interface 820 may include certain operational benefits for computing systems implementing a related database and/or administrators responsible for overseeing the related database. For example, the inclusion of a related object selection interface 820 in combination with the above-described operations may assist users in identifying and selecting valid parent and child relationships 124, 126 when creating policies for a primary object 134, 204. Such systems and interfaces enable the creation of an RLS policy 108, 208 for one or more related rows of a primary object 134, 204 based on another record within a child object 138, 138 or a parent object 139 without having to prepare implementing SQL statements. Further, such systems enable the creation of an RLS policy 108, 208 for one or more related rows of a primary object 134, 204 based on a specific user, group of users, or role without preparing SQL statements. For example, an RLS policy 108, 208 may be created using the interfaces 800, 820 to create an RLS policy that grants administrators of a database access to no records, one record, or multiple records of a primary object 134, 204.

Further, by enabling the creation of such RLS policies 108, 208 and the extension of extended RLS policies 116, the user interfaces 800, 820 may enable non-technical users to create and implement data access policies 106, 202. This may result in increased efficiency and relevancy of applicable data access policies 106, 202 because, conventionally, database administrators capable of generating such policies may have minimal knowledge about underlying business or organizational interactions that warrant certain data access policies 106, 202. By enabling those more familiar with the underlying relationships and structures to create the data access policies 106, 202, the user interfaces 800, 820 improve the relevancy of such policies to the underlying business or other operations, thereby improving security and efficacy.

From an operational perspective, the user interfaces 800, 820 additionally enable a real-time visual depiction of how a certain data access policy 106, 202 will impact a primary object 134, 204 and related child or parent objects 136, 138, 137, 139 by clearly identifying the related objects available and included within a given data access policy 106, 202. Such an implementation obviates the need to manually identify child and parent objects 136, 138, 137, 139 and to manually create extended RLS policies 116 for each included child or parent object 136, 138, 137, 139.

Below are reproduced exemplary SQL statements, such as the SQL statements 112, 120. Such statements may be generated, e.g., by the RLS policy creator 104 or the RLS policy extender 114 in generating, e.g., an RLS policy 108, 208 or an extended RLS policy 116. The below exemplary SQL statements 112, 120 include examples of creating an ACL 110, 118, 404, 406 and/or ACL table 402 (e.g., Sections 2.2, 3.2, 4.2), creating an RLS policy 108, 208 (e.g., Section 1.2), creating an RLS policy 108, 208 that is secured by a different object (e.g., Sections 2.1, 3.1, 4.1), and extending an RLS policy 108, 208 to create an extended RLS policy 116 (e.g., Sections 4.3).

```
--Section 1: Creating a security policy on the customer object 302
--Section 1.1: Create a static function
CREATE FUNCTION [Smartbox].[GlobalAccessCheck]
(
 @SmartBoxObjectGuid   UNIQUEIDENTIFIER,
 @UserFQN        NVARCHAR(488)
)
RETURNS TABLE
--WITH SCHEMABINDING
AS RETURN
(
 SELECT
  [Permitted] = 1
 FROM [Identity].[Identity] AS i
 WHERE
  i.[FQN] = @UserFQN
  AND [Authorization].[IsAuthorizedForObject](i.ID, @SmartBoxObjectGuid, 2) <> 0 --
  2 is the mask for View Data rights
);
--Full access on customer
--Section 1.2: Create a full access RLS policy 108, 208 on the customer object 302
CREATE SECURITY POLICY [Smartbox].[4eb7ac38208b46738bf91ad1ba906759_
f5d0e157916c426580322cf93f98c460__RLSPolicy]
ADD FILTER PREDICATE [Smartbox].[4eb7ac38208b46738bf91ad1ba906759_
f5d0e157916c426580322cf93f98c460__f5d0e157916c426580322cf93f98c460__Predicate]
([ID]) ON [SmartBoxData].[Customer]
WITH (STATE = ON, SCHEMABINDING = OFF)
--predicate
CREATE FUNCTION [Smartbox].[4eb7ac38208b46738bf91ad1ba906759_
f5d0e157916c426580322cf93f98c460__f5d0e157916c426580322cf93f98c460__Predicate]
(
     @ID              BIGINT
)
RETURNS TABLE
--WITH SCHEMABINDING
AS RETURN
(
     SELECT [Permitted] FROM [Smartbox].[GlobalAccessCheck]('b26a1d1a-3321-
     4d4b-a74e-a2891e371b2c', CONVERT(NVARCHAR(448),
     SESSION_CONTEXT(N'___k2_user_fqn')))
);
--Section 2: Create a Policy on customer object 302 that is secured by the region object
320
--Section 2.1: Create the RLS policy 108, 208
CREATE SECURITY POLICY [Smartbox].[db29a025749e4689b34fe480c8ead3fe_
f5d0e157916c426580322cf93f98c460__RLSPolicy]
ADD FILTER PREDICATE [Smartbox].[db29a025749e4689b34fe480c8ead3fe_
f5d0e157916c426580322cf93f98c460__f5d0e157916c426580322cf93f98c460__Predicate]
([ID]) ON [SmartBoxData].[Customer]
WITH (STATE = ON, SCHEMABINDING = OFF)
--Section 2.2: Create ACL table 402 between customer object 302 and region object 320
CREATE TABLE [Smartbox].[db29a025749e4689b34fe480c8ead3fe_
f05c388b936d44c682a0d97a999236ed__ACL](
    [ID] [int] IDENTITY(1,1) NOT NULL,
    [FKID] [bigint] NOT NULL,
    [IdentityID] [int] NOT NULL,
    [___CreatedUtc] [datetime2](7) NOT NULL,
```

```
        [__CreatedBy] [nvarchar](448) NOT NULL,
        [__ModifiedUtc] [datetime2](7) NOT NULL,
        [__ModifiedBy] [nvarchar](448) NOT NULL,
        [__ModifiedVersion] [timestamp] NOT NULL,
CONSTRAINT [PK_Smartbox_db29a025749e4689b34fe480c8ead3fe_
f05c388b936d44c682a0d97a999236ed_ID] PRIMARY KEY CLUSTERED
(
    [ID] ASC
)WITH (PAD_INDEX = OFF, STATISTICS_NORECOMPUTE = OFF,
IGNORE_DUP_KEY = OFF, ALLOW_ROW_LOCKS = ON, ALLOW_PAGE_LOCKS =
ON) ON [PRIMARY]
) ON [PRIMARY]
GO
ALTER TABLE [Smartbox].[db29a025749e4689b34fe480c8ead3fe_
f05c388b936d44c682a0d97a999236ed_ACL] ADD CONSTRAINT
[DF_Smartbox_db29a025749e4689b34fe480c8ead3fe_f05c388b936d44c682a0d97a99
9236ed___CreatedUtc] DEFAULT (getutcdate( )) FOR [__CreatedUtc])
GO
ALTER TABLE [Smartbox].[db29a025749e4689b34fe480c8ead3fe_
f05c388b936d44c682a0d97a999236ed_ACL] WITH CHECK ADD CONSTRAINT
[FK_Smartbox_db29a025749e4689b34fe480c8ead3fe_f05c388b936d44c682a0d97a99
9236ed_SmartBoxData_f05c388b936d44c682a0d97a999236ed] FOREIGN KEY([FKID])
REFERENCES [SmartBoxData].[Region] ([ID])
GO
ALTER TABLE [Smartbox].[db29a025749e4689b34fe480c8ead3fe_
f05c388b936d44c682a0d97a999236ed_ACL] CHECK CONSTRAINT
[FK_Smartbox_db29a025749e4689b34fe480c8ead3fe_f05c388b936d44c682a0d97a99
9236ed_SmartBoxData_f05c388b936d44c682a0d97a999236ed]
GO
--Predicates
CREATE FUNCTION [Smartbox].[db29a025749e4689b34fe480c8ead3fe_
f5d0e157916c426580322cf93f98c460_f5d0e157916c426580322cf93f98c460_Predicate]
(
    @ID              BIGINT
)
RETURNS TABLE
--WITH SCHEMABINDING
AS RETURN
(
        SELECT [Permitted] = 1
        FROM [SmartBoxData].[Customer] AS t
        CROSS APPLY [Smartbox].[db29a025749e4689b34fe480c8ead3fe_
        f5d0e157916c426580322cf93f98c460_f05c388b936d44c682a0d97a9992
        36ed_Predicate]( t.[RegionID])
        WHERE t.[ID] = @ID );
CREATE FUNCTION [Smartbox].[db29a025749e4689b34fe480c8ead3fe_f5d0e157
916c426580322cf93f98c460_f05c388b936d44c682a0d97a999236ed_Predicate]
(
    @ID              BIGINT
)
RETURNS TABLE
--WITH SCHEMABINDING
AS RETURN
(
        SELECT [Permitted] = 1
        FROM [Identity].[Identity] AS i
        CROSS APPLY [Identity].GetIdentityAndContainers(i.ID) AS f
        INNER JOIN [Smartbox].[db29a025749e4689b34fe480c8ead3fe_
        f05c388b936d44c682a0d97a999236ed_ACL] AS p
                    ON p.[IdentityID] = f.[ID] AND p.FKID = @ID
        WHERE
                    i.[FQN] = CONVERT(NVARCHAR(448),
                    SESSION_CONTEXT(N'__k2_user_fqn'))
        UNION ALL
        SELECT [Permitted]
        FROM [Smartbox].[GlobalAccessCheck]('b26a1d1a-3321-4d4b-a74e-
        a2891e371b2c', CONVERT(NVARCHAR(448),
        SESSION CONTEXT(N'__k2_user_fqn')))
);
--Section 3: Creating a policy on the order object 302 that is secured by the region object
320
--Section 3.1: Create the RLS policy 108, 208
CREATE SECURITY POLICY [Smartbox].[b63623ef948e4dc58a40a639716c459b_
fb0f644e1319417f9d9c4c88ad5deb46_RLSPolicy]
ADD FILTER PREDICATE [Smartbox].[b63623ef948e4dc58a40a639716c459b_
fb0f644e1319417f9d9c4c88ad5deb46_fb0f644e1319417f9d9c4c88ad5deb46_Predicate
]([ID]) ON [SmartBoxData].[Order]
WITH (STATE = OFF, SCHEMABINDING = OFF)
```

```
--Section 3.2: Create an ACL table 402 between the order object 302 and the region
object 320
CREATE TABLE
[Smartbox].[b63623ef948e4dc58a40a639716c459b__f05c388b936d44c682a0d97a99923
6ed__ACL](
    [ID] [int] IDENTITY(1,1) NOT NULL,
    [FKID] [bigint] NOT NULL,
    [IdentityID] [int] NOT NULL,
    [___CreatedUtc] [datetime2](7) NOT NULL,
    [___CreatedBy] [nvarchar](448) NOT NULL,
    [___ModifiedUtc] [datetime2](7) NOT NULL,
    [___ModifiedBy] [nvarchar](448) NOT NULL,
    [___ModifiedVersion] [timestamp] NOT NULL,
CONSTRAINT [PK__Smartbox__b63623ef948e4dc58a40a639716c459b__
f05c388b936d44c682a0d97a999236ed__ID] PRIMARY KEY CLUSTERED
(
    [ID] ASC
)WITH (PAD_INDEX = OFF, STATISTICS_NORECOMPUTE = OFF,
IGNORE_DUP_KEY = OFF, ALLOW_ROW_LOCKS = ON, ALLOW_PAGE_LOCKS =
ON) ON [PRIMARY]
) ON [PRIMARY]
GO
ALTER TABLE [Smartbox].[b63623ef948e4dc58a40a639716c459b__
f05c388b936d44c682a0d97a999236ed__ACL] ADD CONSTRAINT
[DF__Smartbox__b63623ef948e4dc58a40a639716c459b__f05c388b936d44c682a0d97a99
9236ed____CreatedUtc] DEFAULT (getutcdate( )) FOR [___CreatedUtc]
GO
ALTER TABLE [Smartbox].[b63623ef948e4dc58a40a639716c459b__
f05c388b936d44c682a0d97a999236ed__ACL] WITH CHECK ADD CONSTRAINT
[FK__Smartbox__b63623ef948e4dc58a40a639716c459b__f05c388b936d44c682a0d97a99
9236ed__SmartBoxData__f05c388b936d44c682a0d97a999236ed] FOREIGN KEY([FKID])
REFERENCES [SmartBoxData].[Region] ([ID])
GO
ALTER TABLE [Smartbox].[b63623ef948e4dc58a40a639716c459b__
f05c388b936d44c682a0d97a999236ed__ACL] CHECK CONSTRAINT
[FK__Smartbox__b63623ef948e4dc58a40a639716c459b__f05c388b936d44c682a0d97a99
9236ed__SmartBoxData__f05c388b936d44c682a0d97a999236ed]
GO
--Predicates
CREATE FUNCTION [Smartbox].[b63623ef948e4dc58a40a639716c459b__
fb0f644e1319417f9d9c4c88ad5deb46__fb0f644e1319417f9d9c4c88ad5deb46__Predicate
]
(
    @ID             BIGINT
)
RETURNS TABLE
--WITH SCHEMABINDING
AS RETURN
(
    SELECT [Permitted] = 1
    FROM [SmartBoxData].[Order] AS t
    CROSS APPLY [Smartbox].[b63623ef948e4dc58a40a639716c459b__
    fb0f644e1319417f9d9c4c88ad5deb46__f5d0e157916c426580322cf93f98c
    460__Predicate]( t.[CustomerID])
    WHERE t.[ID] = @ID );
CREATE FUNCTION [Smartbox].[b63623ef948e4dc58a40a639716c459b__
fb0f644e1319417f9d9c4c88ad5deb46__f5d0e157916c426580322cf93f98c460__Predicate]
(
    @ID             BIGINT
)
RETURNS TABLE
--WITH SCHEMABINDING
AS RETURN
(
    SELECT [Permitted] = 1
    FROM [SmartBoxData].[Customer] AS t
    CROSS APPLY [Smartbox].[b63623ef948e4dc58a40a639716c459b__
    fb0f644e1319417f9d9c4c88ad5deb46__f05c388b936d44c682a0d97a9992
    36ed__Predicate]( t.[RegionID])
    WHERE t.[ID] = @ID );
CREATE FUNCTION [Smartbox].[b63623ef948e4dc58a40a639716c459b__fb0f64
4e1319417f9d9c4c88ad5deb46__f05c388b936d44c682a0d97a999236ed__Predicate]
(
    @ID             BIGINT
)
RETURNS TABLE
--WITH SCHEMABINDING
AS RETURN
(
```

```
        SELECT [Permitted] = 1
        FROM [Identity].[Identity] AS i
        CROSS APPLY [Identity].GetIdentityAndContainers(i.ID) AS f
        INNER JOIN [Smartbox].[b63623ef948e4dc58a40a639716c459b_
        f05c388b936d44c682a0d97a9999236ed_ACL] AS p
                ON p.[IdentityID] = f.[ID] AND p.FKID = @ID
        WHERE
                i.[FQN] = CONVERT(NVARCHAR(448),
                SESSION_CONTEXT(N'___k2_user_fqn'))
        UNION ALL
        SELECT [Permitted]
        FROM [Smartbox].[GlobalAccessCheck]('734c2776-93e2-450b-a13c-
        ba12d4eea25', CONVERT(NVARCHAR(448),
        SESSION CONTEXT(N'___k2_user_fqn')))
    );
--Section 4: creating a policy on the customer object 302 that is secured by the region
object 320 and extended to the order details object 314
--Section 4.1: Create the RLS policy 108, 208
CREATE SECURITY POLICY [Smartbox].[3af149adc2054dd2b63c52d73298d0ed_
f5d0e157916c426580322cf93f98c460_RLSPolicy]
ADD FILTER PREDICATE [Smartbox].[3af149adc2054dd2b63c52d73298d0ed_
f5d0e157916c426580322cf93f98c460_f5d0e157916c426580322cf93f98c460_Predicate]
([ID]) ON [SmartBoxData].[Customer],
ADD FILTER PREDICATE [Smartbox].[3af149adc2054dd2b63c52d73298d0ed_
f5d0e157916c426580322cf93f98c460_fb0f644e1319417f9d9c4c88ad5deb46_Predicate]
([ID]) ON [SmartBoxData].[Order],
ADD FILTER PREDICATE [Smartbox].[3af149adc2054dd2b63c52d73298d0ed_
f5d0e157916c426580322cf93f98c460_6d52f50bc097412d938bf2669b3dbe23_Predicat
e]([ID]) ON [SmartBoxData].[OrderDetails]
WITH (STATE = ON, SCHEMABINDING = OFF)
GO
--Section 4.2: Create the ACL table 402, which may be the same as Section 2.2
--Section 4.3: Extend the policy to the order details object 314, creating an extended
RLS policy 116
CREATE FUNCTION [Smartbox].[3af149adc2054dd2b63c52d73298d0ed_
f5d0e157916c426580322cf93f98c460_6d52f50bc097412d938bf2669b3dbe23_Predicat
e]
(
    @ID             BIGINT
)
RETURNS TABLE
--WITH SCHEMABINDING
AS RETURN
(
        SELECT [Permitted] = 1
        FROM [SmartBoxData].[OrderDetails] AS t
        CROSS APPLY [Smartbox].[3af149adc2054dd2b63c52d73298d0ed_
        f5d0e157916c426580322cf93f98c460_fb0f644e1319417f9d9c4c88ad5de
        b46_Predicate]( t.[OrderID])
        WHERE t.[ID] = @ID );
CREATE FUNCTION [Smartbox].[3af149adc2054dd2b63c52d73298d0ed_
f5d0e157916c426580322cf93f98c460_fb0f644e1319417f9d9c4c88ad5deb46_Predicate]
(
    @ID             BIGINT
)
RETURNS TABLE
--WITH SCHEMABINDING
AS RETURN
(
        SELECT [Permitted] = 1
        FROM [SmartBoxData].[Order] AS t
        CROSS APPLY [Smartbox].[3af149adc2054dd2b63c52d73298d0ed_
        f5d0e157916c426580322cf93f98c460_f5d0e157916c426580322cf93f98c
        460_Predicate]( t.[CustomerID])
        WHERE t.[ID] = @ID );
CREATE FUNCTION [Smartbox].[3af149adc2054dd2b63c52d73298d0ed_
f5d0e157916c426580322cf93f98c460_f5d0e157916c426580322cf93f98c460_Predicate]
(
    @ID             BIGINT
)
RETURNS TABLE
--WITH SCHEMABINDING
AS RETURN
(
        SELECT [Permitted] = 1
        FROM [SmartBoxData].[Customer] AS t
        CROSS APPLY [Smartbox].[3af149adc2054dd2b63c52d73298d0ed_
        f5d0e157916c426580322cf93f98c460_f05c388b936d44c682a0d97a9992
```

```
        36ed_Predicate]( t.[RegionID])
        WHERE t.[ID] = @ID );
CREATE FUNCTION [Smartbox].[3af149adc2054dd2b63c52d73298d0ed_
f5d0e157916c426580322cf93f98c460__f05c388b936d44c682a0d97a999236ed__Predicat
e]
(
    @ID             BIGINT
)
RETURNS TABLE
--WITH SCHEMABINDING
AS RETURN
(
        SELECT [Permitted] = 1
        FROM [Identity].[Identity] AS i
        CROSS APPLY [Identity].GetIdentityAndContainers(i.ID) AS f
        INNER JOIN [Smartbox].[3af149adc2054dd2b63c52d73298d0ed__
        f05c388b936d44c682a0d97a999236ed__ACL] AS p
                        ON p.[IdentityID] = f.[ID] AND p.FKID = @ID
        WHERE
                        i.[FQN] = CONVERT(NVARCHAR(448),
                        SESSION_CONTEXT(N'___k2_user_fqn'))
        UNION ALL
        SELECT [Permitted]
        FROM [Smartbox].[GlobalAccessCheck]('b26a1d1a-3321-4d4b-a74e-
        a2891e371b2c', CONVERT(NVARCHAR(448),
        SESSION_CONTEXT(N'___k2_user_fqn')))
);
```

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method comprising,
accessing an object database, wherein objects stored within the object database correspond to separate SQL data tables;
creating a row-level security (RLS) policy for a primary object stored within the object database, wherein the RLS policy comprises
(i) an access control list specifying row-level access permissions and
(ii) a first plurality of SQL statements implementing the access control list;
searching a relationship database separate from the object database for a set of child relationships between a set of child objects and the primary object,
wherein the set of child objects corresponds to at least one SQL data table that requires access, via the RLS policy, to at least a portion of data stored in an SQL data table corresponding to the primary object,
wherein the relationship database stores relationship data for relationships between objects within the object database, and
wherein the relationship data is separate from data stored within the object database;
filtering, after the searching, the set of child relationships to identify a set of valid child relationships by
(i) determining whether each child relationship in the set of child relationships is valid or invalid, and
(ii) removing each invalid child relationship, wherein the determining is distinct from the removing,
wherein invalid child relationships include child relationships that are forbidden, circular, or duplicative;
identifying, within the object database, a set of valid child objects of the primary object based on the set of valid child relationships;
receiving a request to extend the RLS policy to the set of valid child objects; and
extending the RLS policy to the set of valid child objects.

2. The method of claim 1, wherein identifying the child object of the primary object based on the set of valid child relationships, receiving the request to extend the RLS policy to the child object, and extending the RLS policy to the child object further comprise:
identifying a plurality of child objects of the primary object based on the set of valid child relationships;
receiving a request to extend the RLS policy to a subset of the plurality of child objects; and
extending the RLS policy to the subset of the plurality of child objects.

3. The method of claim 1,
wherein the primary object is a SmartBox Object configured to store its data in a related SQL table, and
wherein the RLS policy is generated for the related SQL table in response to receiving a request to apply a data access policy to the SmartBox Object, and.

4. The method of claim 3, wherein the data access policy includes a policy selected from the group consisting of: (i) a full access policy, (ii) a limited access policy, and (iii) a combination of a full access policy and a limited access policy for data stored within the related SQL table.

5. The method of claim 1, wherein extending the RLS policy includes generating a second plurality of SQL statements to extend the RLS policy to the child object.

6. The method of claim 1, wherein searching a relationship database for the set of child relationships of the primary object further comprises identifying one or more foreign-key relationships of the primary object within the relationship database.

7. The method of claim 1, further comprising:
searching the relationship database for one or more parent relationships of the primary object;
filtering the one or more parent relationships to identify one or more valid parent relationships by
(i) determining whether each of the one or more parent relationships is valid or invalid, and
(ii) removing each invalid parent relationship; and
identifying a parent object of the primary object based on the one or more valid parent relationships.

8. The method of claim 7, further comprising;
receiving a request to update the RLS policy;
updating the RLS policy for the primary object to create an updated RLS policy; and
extending the updated RLS policy to the parent object.

9. The method of claim 1, wherein invalid child relationships include multiple child relationships from a single child object to the primary object.

10. A system comprising:
a processor; and
a memory containing instructions which, when executed by the processor, cause the processor to implement:
a row-level security (RLS) policy creator configured to:
access an object database, wherein objects stored within the object database correspond to separate SQL data tables;
create an RLS policy for a primary object stored within the object database, wherein the RLS policy comprises
(i) an access control list specifying row-level access permissions and
(ii) a first plurality of SQL statements implementing the access control list;
a related object identifier configured to:
search a relationship database separate from the object database for a set of child relationships between a set of child objects and the primary object,
wherein the set of child objects corresponds to at least one SQL data table that requires access, via the RLS policy, to at least a portion of data stored in an SQL data table corresponding to the primary object,
wherein the relationship database stores relationship data for relationships between objects within the object database, and
wherein the relationship data is separate from data stored within the object database;
filter, after the relationship database is searched, the set of child relationships to identify a set of valid child relationships by
(i) determining whether each child relationship in the set of child relationships is valid or invalid, and
(ii) removing each invalid child relationship, wherein the determining is distinct from the removing,
wherein invalid child relationships include child relationships that are forbidden, circular, or duplicative; and
identify, within the object database, a set of valid child objects of the primary object based on the set of valid child relationships; and an RLS policy extender configured to:
receive a request to extend the RLS policy to the set of valid child objects; and extend the RLS policy to the set of valid child objects.

11. The system of claim 10,
wherein the related object identifier is further configured to:
identify a plurality of child objects of the primary object based on the set of valid child relationships, and
wherein the RLS policy extender is further configured to:
receive a request to extend the RLS policy to a subset of the plurality of child objects; and
extend the RLS policy to the subset of the plurality of child objects.

12. The system of claim 10, wherein the primary object is a SmartBox Object configured to store its data in a related SQL table, and wherein the RLS policy extender is further configured to generate a second plurality of SQL statements to extend the RLS policy to the child object.

13. The system of claim 10, wherein the related object identifier is further configured to identify one or more foreign-key relationships of the primary object within the relationship database.

14. The system of claim 10, wherein the related object identifier is further configured to:
search the relationship database for one or more parent relationships of the primary object;
filter the one or more parent relationships to identify one or more valid parent relationships by
(i) determining whether each of the one or more parent relationships is valid or invalid, and
(ii) removing each invalid parent relationship; and
identify a parent object of the primary object based on the one or more parent relationships.

15. The system of claim 10, wherein the RLS policy creator is further configured to:
receive a request to update the RLS policy; and
update the RLS policy for the primary object to create an updated RLS policy, and
wherein the RLS policy extender is further configured to: extend the updated RLS policy to the child object.

16. The system of claim 14, wherein the RLS policy creator is further configured to:
receive a request to update the RLS policy; and
update the RLS policy for the primary object to create an updated RLS policy, and
wherein the RLS policy extender is further configured to: extend the updated RLS policy to the parent object.

17. The system of claim 10,
wherein the relationship database stores a relationship order for each child relationship in the set of child relationships with respect to the primary object, and
wherein the related object identifier is further configured to:
generate a tree structure based on the relationship order for each child relationship in the set of child relationships, wherein child objects with child relationships corresponding to greater relationship order are placed further from the primary object.

18. A non-transitory, computer-readable medium storing instructions which, when executed by a processor, cause the processor to:
access an object database, wherein objects stored within the object database correspond to separate SQL data tables;

create a row-level security (RLS) policy for a primary object stored within the object database, wherein the RLS policy comprises
(i) an access control list specifying row-level access permissions and
(ii) a first plurality of SQL statements implementing the access control list;
search a relationship database separate from the object database for a set of child relationships between a set of child objects and the primary object,
wherein the set of child objects corresponds to at least one SQL data table that requires access, via the RLS policy to at least a portion of data stored in an SQL data table corresponding to the primary object,
wherein the relationship database stores relationship data for relationships between objects within the object database, and
wherein the relationship data is separate from data stored within the object database;
filter, after the relationship database is searched, the set of child relationships to identify a set of valid child relationships by
(i) determining whether each child relationship in the set of child relationships is valid or invalid, and
(ii) removing each invalid child relationship, wherein the determining is distinct from the removing,
wherein invalid child relationships include child relationships that are forbidden, circular, or duplicative;
identify, within the object database, a set of valid child objects of the primary object based on the set of valid child relationships;
receive a request to extend the RLS policy to the set of valid child objects; and
extend the RLS policy to the set of valid child objects.

19. The non-transitory, computer-readable medium of claim 18, wherein the instructions which, when executed by a processor, further cause the processor to:
access a user interface for creating data policies;
display, at the user interface, the identified set of valid child objects;
receive, at the user interface, a user selection to extend the RLS policy to a subset of valid child objects from the set of valid child objects; and
responsive to the user selection, display, at the user interface, a set of projected effects of extending the RLS policy to the subset of valid child objects.

* * * * *